United States Patent
Ogata et al.

(10) Patent No.: US 12,442,806 B2
(45) Date of Patent: Oct. 14, 2025

(54) ODOR DETECTION DEVICE, ODOR DETECTION METHOD, AND PROGRAM

(71) Applicant: I-PEX Inc., Kyoto (JP)

(72) Inventors: Kenji Ogata, Ogori (JP); Takeshi Suzuki, Ogori (JP); Hisatoshi Sakamoto, Ogori (JP); Yuki Hayata, Ogori (JP)

(73) Assignee: I-PEX Inc., Kyoto (JP)

( * ) Notice: Subject to any disclaimer, the term of this patent is extended or adjusted under 35 U.S.C. 154(b) by 352 days.

(21) Appl. No.: 17/928,239

(22) PCT Filed: May 13, 2021

(86) PCT No.: PCT/JP2021/018177
§ 371 (c)(1),
(2) Date: Nov. 28, 2022

(87) PCT Pub. No.: WO2021/241244
PCT Pub. Date: Dec. 2, 2021

(65) Prior Publication Data
US 2023/0221294 A1 Jul. 13, 2023

(30) Foreign Application Priority Data

May 29, 2020 (JP) .................................. 2020-094854
Dec. 25, 2020 (JP) .................................. 2020-217205

(51) Int. Cl.
*G01N 33/00* (2006.01)
*G01N 5/02* (2006.01)
(Continued)

(52) U.S. Cl.
CPC ............. *G01N 33/006* (2013.01); *G01N 5/02* (2013.01); *G01N 5/025* (2013.01); *G01N 27/02* (2013.01);
(Continued)

(58) Field of Classification Search
CPC ........ G01N 33/006; G01N 5/02; G01N 5/025; G01N 27/02; G01N 29/036;
(Continued)

(56) References Cited

U.S. PATENT DOCUMENTS 6,598,459 B1 * 7/2003 Fu ..................... G01N 33/0031
73/24.06
12,066,416 B2 * 8/2024 Hattori ............... G01N 33/0027
(Continued)

FOREIGN PATENT DOCUMENTS

CN 107064234 A 8/2017
CN 107870183 A 4/2018
(Continued)

OTHER PUBLICATIONS

KR-20200048294-A English Translation (Year: 2020).*
(Continued)

*Primary Examiner* — Ryan D Walsh
(74) *Attorney, Agent, or Firm* — Howard & Howard Attorneys PLLC

(57) ABSTRACT

An odor detection device (1) includes an odor sensor (10), environmental information measurement means (11, 12), odor information collection means (20), difference information acquisition means (21), and correction means (22). The odor sensor (10) detects information on an odor emitted from an odor source (2). The environmental information measurement means (11, 12) measures information on an environment, correlated with the amount of water vapor contained in surrounding gas. The difference information acquisition means (21) acquires the difference amount of water vapor, indicating a difference between information on an environment surrounding the odor sensor (10) and information on an environment surrounding the odor source (2). The correction means (22) corrects information on an odor,
(Continued)

collected by the odor information collection means (20), on the basis of difference information acquired by the difference information acquisition means (21).

15 Claims, 16 Drawing Sheets

(51) Int. Cl.
    *G01N 27/02*     (2006.01)
    *G01N 29/036*     (2006.01)
    *G01N 33/497*     (2006.01)

(52) U.S. Cl.
    CPC ....... *G01N 29/036* (2013.01); *G01N 33/0047* (2013.01); *G01N 33/0067* (2013.01); *G01N 33/0004* (2013.01); *G01N 33/0031* (2013.01); *G01N 33/0073* (2013.01); *G01N 33/497* (2013.01); *G01N 2291/0255* (2013.01); *G01N 2291/0256* (2013.01)

(58) Field of Classification Search
    CPC ........... G01N 33/0047; G01N 33/0067; G01N 33/0004; G01N 33/0031; G01N 33/0073; G01N 33/497; G01N 2291/0255; G01N 2291/0256
    See application file for complete search history.

(56) References Cited

U.S. PATENT DOCUMENTS

| | | | |
|---|---|---|---|
| 2011/0102182 A1 | 5/2011 | Ohya | |
| 2014/0109649 A1 | 4/2014 | Fleischer et al. | |
| 2017/0089875 A1 | 3/2017 | Hasegawa et al. | |
| 2018/0088088 A1* | 3/2018 | Shimomai | G01N 29/4463 |
| 2019/0056370 A1 | 2/2019 | Yamasaki et al. | |
| 2021/0003543 A1* | 1/2021 | Hattori | G01N 29/022 |
| 2023/0152290 A1* | 5/2023 | Ogata | G01N 33/0027 73/23.2 |
| 2023/0266206 A1* | 8/2023 | Oshita | G01N 33/497 73/31.02 |

FOREIGN PATENT DOCUMENTS

| | | | |
|---|---|---|---|
| CN | 109975488 A | | 7/2019 |
| CN | 110006957 A | | 7/2019 |
| JP | H01-107142 A | | 4/1989 |
| JP | H05-72094 A | | 3/1993 |
| JP | H05-312748 A | | 11/1993 |
| JP | H07-159358 A | | 6/1995 |
| JP | H07-272158 A | | 10/1995 |
| JP | H08-220042 A | | 8/1996 |
| JP | 2009-204584 A | | 9/2009 |
| JP | 2020012732 A | | 1/2020 |
| KR | 20200048294 A | * | 5/2020 |
| WO | 00/28318 A2 | | 5/2000 |
| WO | 2017/145933 A1 | | 8/2017 |
| WO | 2019/074922 A1 | | 4/2019 |
| WO | 2019/187671 A1 | | 10/2019 |

OTHER PUBLICATIONS

European Search Report dated Dec. 22, 2023, Application No. EP 21 81 3752, 16 pages, place of search The Hague.

Lourenco, Celia et al., Breath Analysis in Disease Diagnosis: Methodological Considerations and Applications, Metabolites, Jun. 20, 2014, pp. 465-498, vol. 4, No. 2.

Endres, Hanns-Erik, et al., A Capacitive CO2 sensor system with suppression of the humidity interference, Sensors and Actuators B: Chemical, Sep. 7, 1999, pp. 83-87, vol. 57, No. 1-3, Elsevier Science S.A.

European Search Report, Application No. EP 21 81 3752.9, Sep. 7, 2023, The Hague, European Patent Office, 16 pages.

Office Action dated Apr. 25, 2025, issued for the corresponding CN Patent Application No. 202180038706.5.

* cited by examiner

ODOR DETECTION DEVICE, ODOR DETECTION METHOD, AND PROGRAM

CROSS-REFERENCE TO RELATED APPLICATIONS

This application is a U.S. National Phase application of International Patent Application No. PCT/JP2021/018177, filed May 13, 2021, which claims the benefit of JP Patent Application No. 2020-094854, filed May 29, 2020 and JP Patent Application No. 2020-217205, filed Dec. 25, 2020, the disclosures of which are hereby incorporated by reference in their entirety.

TECHNICAL FIELD

The present disclosure relates to an odor detection device, an odor detection method, and a program.

BACKGROUND ART

Patent Literature 1 discloses a chemical sensor device to identify a substance on the basis of a variation in the resonance frequency of a vibrator, occurring in the case of adsorption or desorption of the substance. The chemical sensor device includes a plurality of vibrators exhibiting the different properties of desorption and adsorption of a substance, and each of the vibrators includes a piezoelectric substrate. The plurality of vibrators is vibrated by applying an alternating voltage to deform such piezoelectric substrates. The substance can be identified by specifying a vibrator of which the resonance frequency varies.

CITATION LIST

Patent Literature

Patent Literature 1: Unexamined Japanese Patent Application Publication No. 2009-204584

SUMMARY OF INVENTION

Technical Problem

The chemical sensor device described above has had a problem that variations in the accuracy of the results of measurement of even the same substance occur due to a difference between the temperatures or humidities of the surrounding areas of the chemical sensor device and an object to be measured because the chemical sensor device is susceptible to variations in temperature and humidity.

The present disclosure was made under such actual circumstances with an objective to provide an odor detection device, an odor detection method, and a program, in which variations in the accuracy of measurement results can be suppressed.

Solution to Problem

In order to achieve the objective described above, an odor detection device according to a first aspect of the present disclosure includes: an odor sensor to detect information on an odor emitted from a source; environmental information measurement means for measuring information on an environment, correlated with an amount of water vapor contained in surrounding gas; odor information collection means for collecting the information on the odor, detected by the odor sensor; difference information acquisition means for acquiring difference information indicating a difference between the information on the environment surrounding the odor sensor and the information on the environment surrounding the source; and correction means for correcting the information on the odor, collected by the odor information collection means, based on the difference information acquired by the difference information acquisition means.

An odor detection device according to a second aspect of the present disclosure includes: an odor sensor to detect information on an odor emitted from a source; environmental information measurement means for measuring information on an environment, correlated with an amount of water vapor contained in surrounding gas; odor information collection means for collecting the information on the odor, detected by the odor sensor; difference information acquisition means for acquiring difference information indicating a difference between the information on the environment, measured in a state in which the information on the odor has not been detected by the odor sensor, and the information on the environment, measured in a state in which the information on the odor has been detected by the odor sensor; and correction means for correcting the information on the odor, collected by the odor information collection means, based on the difference information acquired by the difference information acquisition means.

In this case, it is also acceptable that the odor sensor and the environmental information measurement means are integrated.

It is also acceptable that: the environmental information measurement means includes: first measurement means for measuring the information on the environment surrounding the odor sensor; and second measurement means for measuring the information on the environment surrounding the source; and the correction means corrects the information on the odor, based on information on a difference between the information on the environment, measured by the second measurement means, and the information on the environment, measured by the first measurement means.

It is also acceptable to further include a blowing opening through which gas is blown into the odor sensor, wherein the blowing opening is provided with the second measurement means.

It is also acceptable that a measurement unit into which the odor sensor and the first measurement means are integrated, and the second measurement means are connected in wired communication.

It is also acceptable that a measurement unit into which the odor sensor and the first measurement means are integrated and the second measurement means are connected in wireless communication.

It is also acceptable that the environmental information measurement means is separate from a measurement unit including the odor sensor, and removable from the measurement unit.

It is also acceptable that: the odor sensor includes a plurality of sensitive membranes to react with substances different from each other, and outputs items of information indicating sensitivity results of the substances, as items of the information on the odor, in correspondence with the sensitive membranes, respectively; and the correction means corrects the items of the information on the odor in correspondence with the sensitive membranes, respectively.

It is also acceptable to further include a storage to store a relationship between the difference information and a correction value corresponding to each of the sensitive membranes, wherein the correction means determines the correction value corresponding to the difference information, based on the relationship stored in the storage, and corrects the odor information, based on the determined correction value.

It is also acceptable that the information on the environment includes at least one of temperature or humidity.

An odor detection method according to a third aspect of the present disclosure is executed by an information-processing device, and includes: a first measurement step of measuring information on an environment, correlated with an amount of water vapor contained in gas surrounding a source of an odor: a second measurement step of detecting information on the odor by an odor sensor and measuring information on an environment, correlated with an amount of water vapor contained in gas surrounding the odor sensor; a difference information acquisition step of acquiring difference information indicating a difference between the information on the environment, measured in the first measurement step, and the information on the environment, measured in the second measurement step; and a correction step of correcting the information on the odor, detected by the second measurement step, based on the difference information acquired in the difference information acquisition step.

An odor detection method according to a fourth aspect of the present disclosure is executed by an information-processing device, and includes: a first measurement step of measuring information on an environment, correlated with an amount of water vapor contained in gas surrounding an odor sensor, in a state in which information on an odor is not detected by the odor sensor; a second measurement step of detecting information on an odor by the odor sensor in a state in which the information on the odor is detected by the odor sensor, and measuring the information on the environment; a difference information acquisition step of acquiring difference information indicating a difference between the information on the environment, measured in the first measurement step, and the information on the environment, measured in the second measurement step; and a correction step of correcting the information on the odor, detected in the second measurement step, based on the difference information acquired in the difference information acquisition step.

A program according to a fifth aspect of the present disclosure causes a computer to function as: odor information collection means for collecting information on an odor, detected by an odor sensor to react with an odor generated from a source; difference information acquisition means for acquiring difference information indicating a difference between information on an environment, correlated with an amount of water vapor contained in gas surrounding the odor sensor, and information on an environment, correlated with an amount of water vapor contained in gas surrounding the source; and correction means for correcting the information on the odor, collected by the odor information collection means, based on the difference information acquired by the difference information acquisition means.

A program according to a sixth aspect of the present disclosure causes a computer to function as: odor information collection means for collecting information on an odor, detected by an odor sensor to react with an odor generated from a source; difference information acquisition means for acquiring difference information indicating a difference between information on an environment, measured in a state in which the information on the odor is not detected by the odor sensor, and correlated with an amount of water vapor contained in gas surrounding the odor sensor, and the information on the environment, measured in a state in which the information on the odor is detected by the odor sensor; and correction means for correcting the odor information collected by the odor information collection means, based on the difference information acquired by the difference information acquisition means.

Advantageous Effects of Invention

In accordance with the present disclosure, an item of information on an environment, correlated with the amount of water vapor contained in gas surrounding an odor sensor, and an item of information on an environment, correlated with the amount of water vapor contained in gas surrounding a source of an odor, are measured, and information on an odor, collected by odor information collection means, is corrected on the basis of information on a difference between the measured items of the information on the environment. As a result, variations in the accuracy of measurement results can be suppressed.

DESCRIPTION OF EMBODIMENTS

Figure 1:
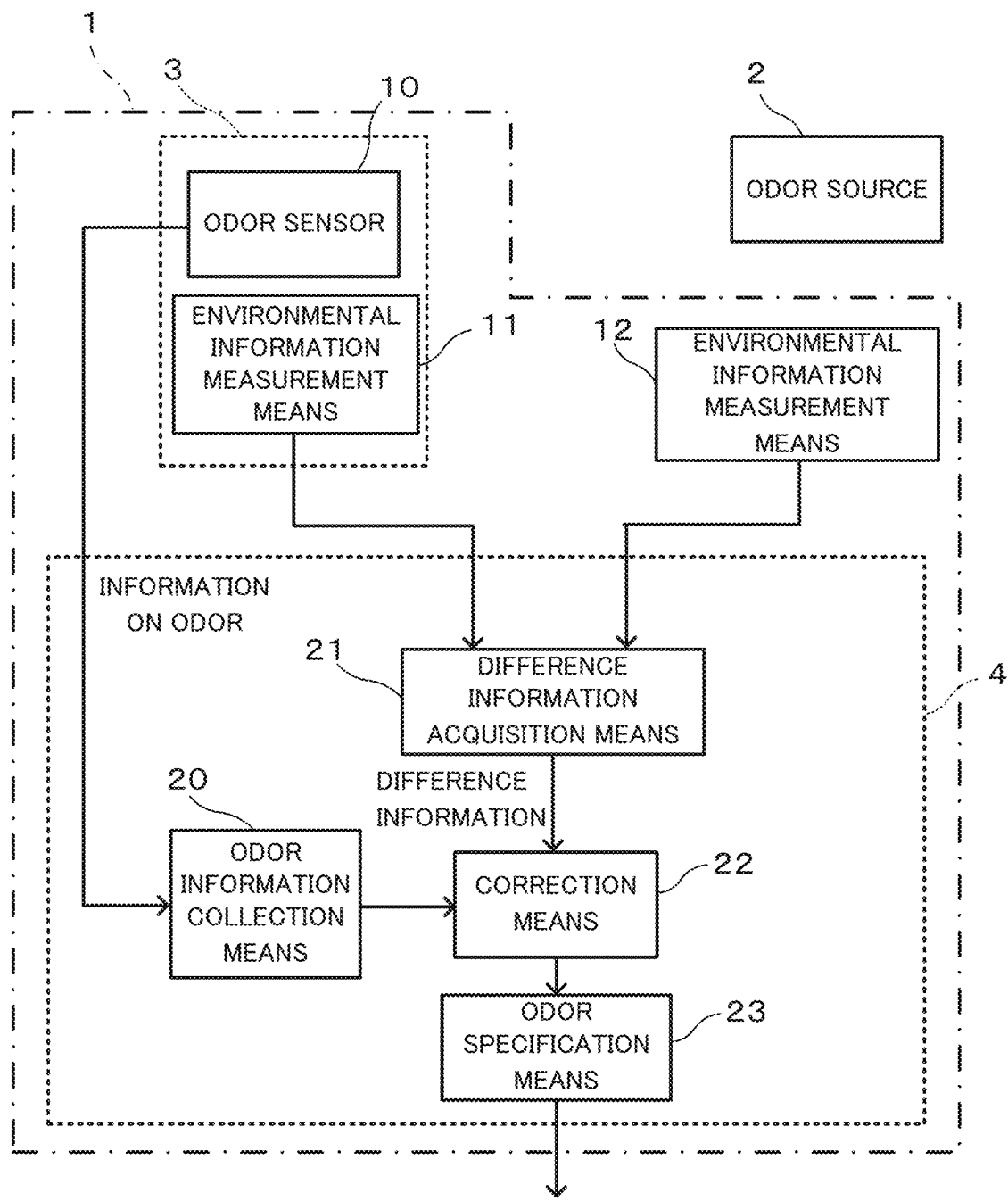
FIG. 1 is a block diagram illustrating the configuration of an odor detection device according to Embodiment 1 of the present disclosure.

Embodiments of the present disclosure are described in detail below with reference to the drawings. In each drawing, the same or similar portions are denoted by the same reference characters. Herein, "surrounding area" refers to a region which comes into contact with a target object and of which the environment condition of the range can be considered to be uniform.

Embodiment 1

First, Embodiment 1 of the present disclosure is described. As illustrated in FIG. 1, an odor detection device 1 according to the present embodiment detects an odor emitted from an odor source 2. Detection of an odor greatly depends on an atmosphere in which the odor floats, that is, the environment condition of surrounding air. Thus, the odor detection device 1 includes a configuration in which items of information on an odor, indicating a detected odor are corrected based on items of information on environments. Specifically, the odor detection device 1 includes an odor sensor 10 and environmental information measurement means 11 and 12.

Figure 2:
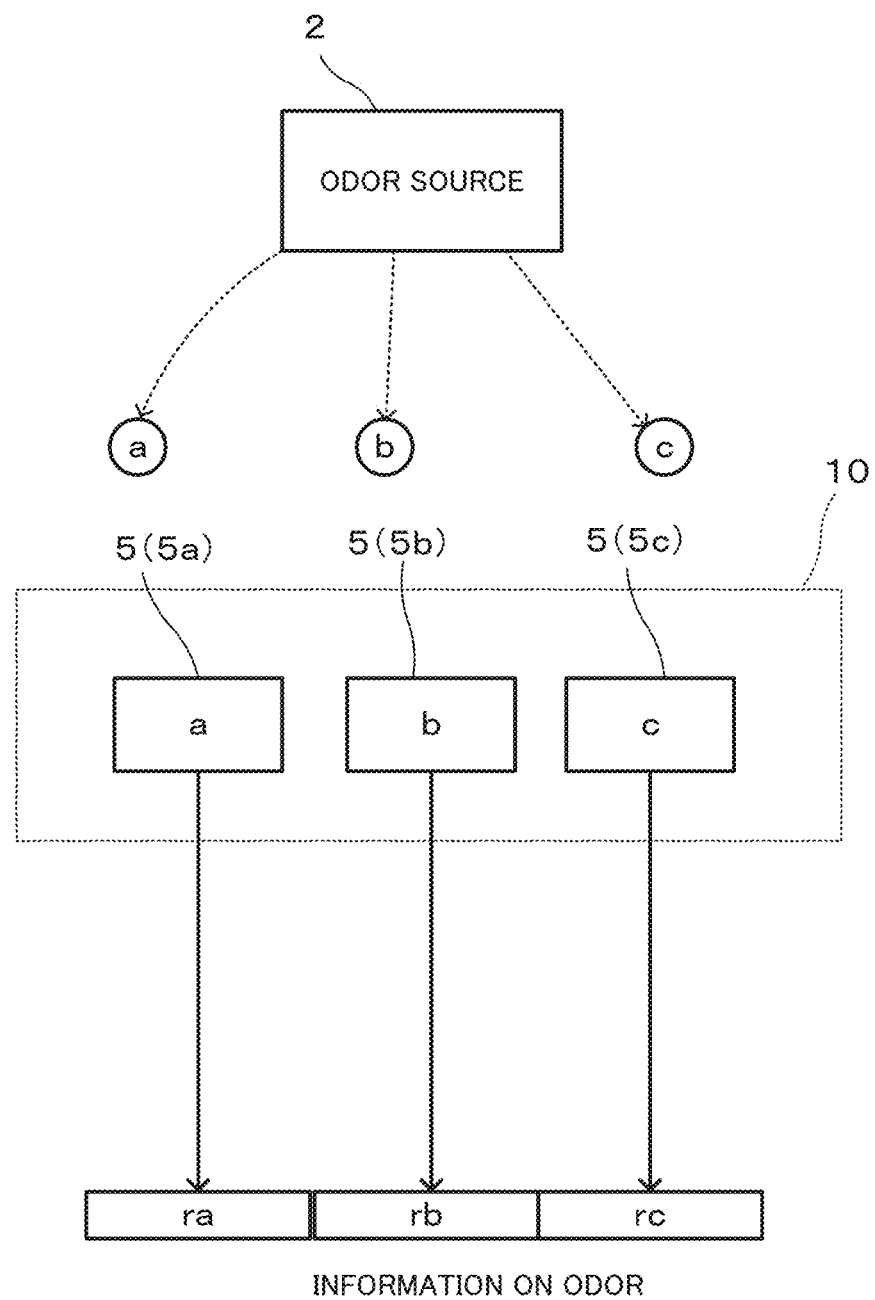
FIG. 2 is a block diagram illustrating the configuration of an odor sensor.

The odor sensor 10 detects items of information on an odor floating in space. In the present embodiment, an odor including a plurality of substances a to c is assumed to float in atmosphere from the odor source 2, as illustrated in FIG. 2. The odor sensor 10 detects the substances a to c. The odor sensor 10 includes a sensitive membrane 5 (5a) to react with the substance a, a sensitive membrane 5 (5b) to react with the substance b, and a sensitive membrane 5 (5c) to react with the substance c.

Examples of the sensitive membranes 5 include various ones such as metals subjected to chemical modification, metal oxide semiconductors, and lipid membranes. In the present embodiment, membranes including acceptors to adsorb the substances a to c can be used as the sensitive membranes 5, and the kinds of the membranes are not particularly limited.

The sensitive membranes 5 are inserted into a structure or an electric circuit disposed in the odor sensor 10. When the sensitive membranes 5 adsorb the substances a to c, the masses and the like of the sensitive membranes 5 vary to change the physical property of the structure including the sensitive membranes 5 or the electric circuit provided with the sensitive membranes 5. Examples of the physical property of the structure include the vibration frequency, refractive index, fluorescence intensity, and temperature of the structure provided with the sensitive membranes 5. Examples of the physical property of the electric circuit including the sensitive membranes 5 include an electric conductivity, a resistance value, an impedance, a potential difference, and a capacitance. The odor sensor 10 detects an odor on the basis of a change in the physical property of the structure or the electric circuit. The odor detection device 1 according to the present embodiment is not limited to the kinds of such physical properties.

For example, when vibration beams are provided with the sensitive membranes 5, reaction of the sensitive membranes 5 with substances included in gas results in increases or decreases in the masses of the sensitive membranes 5 to vary the vibration frequencies of the vibration beams. The odor sensor 10 outputs items of information indicating variations in the vibration frequencies, corresponding to the sensitive membranes 5, respectively. Substances that have reacted with the sensitive membranes 5 (5a, 5b, and 5c), that is, the substances a to c emitted from the odor source 2 can be detected based on the variations.

The odor sensor 10 outputs, as the items of the information on the odor, the reaction results of the substances a to c, that is, items of information indicating the detected reaction values, corresponding to the sensitive membranes 5, respectively. As illustrated in FIG. 2, the reaction values ra, rb, and rc of the substances a, b, and c become the items of the information on the odor.

The amount of water vapor contained in air surrounding the sensitive membranes 5 influences the reaction values of the sensitive membranes 5. Thus, the environmental information measurement means 11 and 12 measure the items of the information on the environments, correlated with the amounts of water vapor contained in surrounding gas.

More specifically, the environmental information measurement means 11 measures the information on the environment surrounding the odor sensor 10. The environmental information measurement means 12 measures the information on the environment surrounding the odor source 2. In other words, in the present embodiment, the environmental information measurement means 11 corresponds to first measurement means, and the environmental information measurement means 12 corresponds to second measurement means.

In the present embodiment, examples of the items of the information on the environment include temperature and humidity as well as the amount of water vapor. The temperature and the humidity are known to be correlated with the amount of water vapor in gas. This is because the sensitive membranes 5 adsorb moisture in gas and therefore the amounts of the substances a to c adsorbed in the sensitive membranes 5 depend on the amount of water vapor in the gas.

In the present embodiment, the odor sensor 10 and the environmental information measurement means 11 are integrated. Hereinafter, a unit into which the odor sensor 10 and the environmental information measurement means 11 are integrated is also referred to as a measurement unit 3.

The odor detection device 1 includes the measurement unit 3 and an information-processing device 4. The information-processing device 4 performs information processing on the basis of detected information on an odor and measured information on an environment, as described above. The hardware resources of a computer execute a software program to thereby cause the information-processing device 4 to implement the functions of the information-processing device 4. The information-processing device 4 includes odor information collection means 20, difference information acquisition means 21, correction means 22, and odor specification means 23, as the functional configuration of the information-processing device 4.

Figure 3:
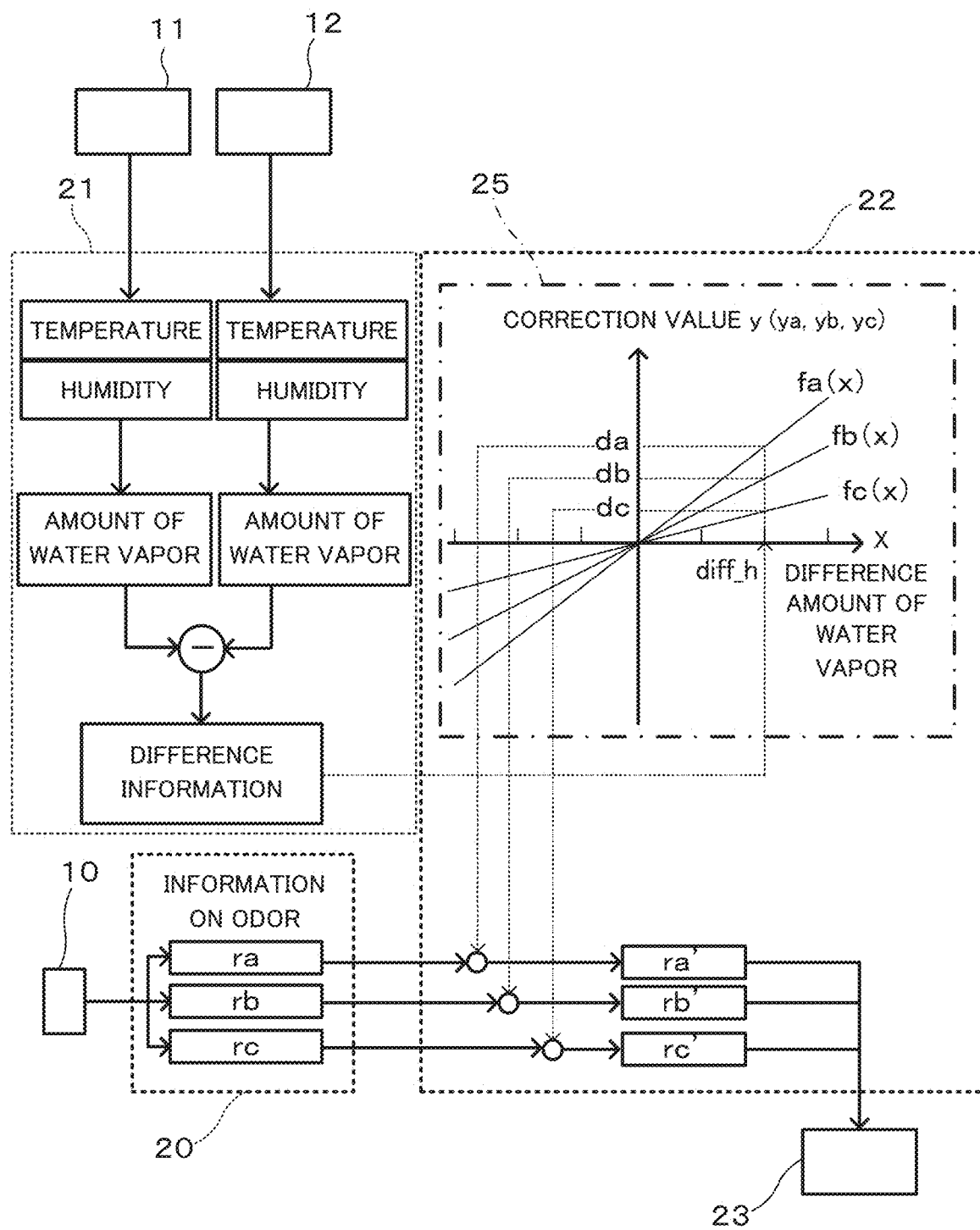
FIG. 3 is a block diagram illustrating a configuration related to correction of information on an odor in the odor detection device in FIG. 1.

As illustrated in FIG. 3, the odor information collection means 20 collects items of information on an odor, detected by the odor sensor 10. In the present embodiment, as illustrated in FIG. 3, the odor information collection means 20 collects, as the items of the information on the odor, items of information indicating the reaction results of the substances a to c, corresponding to the sensitive membranes 5, respectively. The reaction values of the substances a, b, and c, obtained in such a manner, are regarded as the reaction values ra, rb, and rc, respectively.

The difference information acquisition means 21 inputs (acquires) the information on the environment surrounding the odor sensor 10, measured by the environmental information measurement means 11. The difference information acquisition means 21 inputs (acquires) the information on the environment surrounding the odor source 2, measured by the environmental information measurement means 12.

A correlation between temperature, humidity, and the amount of water vapor is as follows. If t represents temperature (° C.), a saturated water vapor pressure e(t) (hPa) at the temperature is represented by the following Equation (1).

[Equation 1]

$$e(t) = 6.11 \times 10^{\left(\frac{7.5t}{t+237.3}\right)} \quad (1)$$

The saturated water vapor pressure e (t) determined from the temperature using Equation (1) as described above is converted into the amount of saturated water vapor a(t) (g/m³), as represented by the following Equation (2).

[Equation 2]

$$a(t) = 217 \times \frac{e(t)}{t+273.15} \quad (2)$$

The amount of water vapor (g/m³) is calculated based on the following Equation (3), in which h represents humidity (%).

[Equation 3]

$$\text{Amount of water vapor} := a(t) \times \frac{h}{100} \quad (3)$$

The difference information acquisition means 21 calculates the amount of water vapor (g/m³) on the basis of the temperature t (° C.) and the humidity h (%) using Equations (1), (2), and (3), as described above. For example, if the temperature is 22.2° C. and the humidity is 63.7%, the amount of water vapor becomes 12.5 g/m³. If the temperature is 28.4° C. and the humidity is 44.5%, the amount of water vapor becomes 12.4 g/m³. If the temperature is 22.8° C. and the humidity is 57.7%, the amount of water vapor becomes 11.7 g/m³.

The difference information acquisition means 21 further acquires difference information indicating a difference between the information on the environment, measured by the environmental information measurement means 11, and the information on the environment surrounding the odor source 2, measured by the environmental information measurement means 12. Specifically, a difference between the amount of water vapor in gas surrounding the odor source 2 and the amount of water vapor in gas surrounding the odor sensor 10 is calculated. The difference is positive when the amount of water vapor in the gas surrounding the odor source 2 is more than the amount of water vapor in the gas surrounding the odor sensor 10, whereas the difference is negative when the amount of water vapor in the gas surrounding the odor source 2 is less than the amount of water vapor in the gas surrounding the odor sensor 10.

The correction means 22 corrects the information on the odor, collected by the odor information collection means 20, on the basis of the difference information acquired by the difference information acquisition means 21 (specifically, indicating the difference between the amounts of water vapor; hereinafter referred to as "difference amount of water vapor"). The correction means 22 corrects the items of the information on the odor (the reaction value of the substance a, the reaction value of the substance b, and the reaction value of the substance c) in correspondence with the respective sensitive membranes 5.

As illustrated in FIG. 3, the correction means 22 includes a storage 25 to store relationships between the difference amount of water vapor as the difference information and the correction values of the information on the odor. The relationships between the difference amount of water vapor and the correction values of the information on the odor, corresponding to the respective sensitive membranes 5 can be represented by a graph illustrated in FIG. 3. In the graph, the abscissa indicates the difference amount x of water vapor, while the ordinate indicates a correction value y. The correction value y represents a variation in the reaction value of each sensitive membrane 5 in a case in which the difference amount of water vapor between the amounts of water vapor contained in gas is x.

As illustrated in FIG. 3, the relationships between the difference amount x of water vapor and the correction values y are linear in a predetermined region centered around a point at which the difference amount x of water vapor is zero. The relationships differ depending on the substances a to c, respectively. As a result, the correction value y corresponding to the substance a is da, the correction value y corresponding to the substance b is db, and the correction value y corresponding to the substance c is dc, for example, even when the difference amount x of water vapor is the same diff_h. The storage 25 stores relational equations fa(x), fb(x), and fc(x) representing linear relationships in correspondence with the respective substances a to c.

The correction means 22 determines the correction values y corresponding to the difference amount x of water vapor on the basis of the relational equations between the difference amount x of water vapor and the correction values y (ya, yb, and yc) corresponding the respective sensitive membranes 5, stored in the storage 25. The relational equations are, for example, as follow.

$$ya = fa(x) = \alpha \times x$$

$$yb = fb(x) = \beta \times x$$

$$yc = fc(x) = \gamma \times x$$

In such a case, α, β, and γ are coefficients demanded in advance in actual measurement, and α>0, β>0, and γ>0 are satisfied. The correction values ya, yb, and yc are determined from the relational equations fa(x), fb(x), and fc(x), that is, from the coefficients α, β, and γ, and the difference amount x of water vapor. The values of the coefficients α, β, and γ are different from each other in the present embodiment; however, the values may be the same.

For example, when the difference amount x of water vapor is diff_h, the correction value ya is fa(diff_h)=α×diff_h, of which the value is da illustrated in FIG. 3. Likewise, the correction value yb is fb(diff_h)=β×diff_h, of which the value is db illustrated in FIG. 3. The correction value yc is fc(diff_h)=γ×diff_h, of which the value is dc illustrated in FIG. 3.

The correction means 22 substitutes the determined correction values ya, yb, and yc into the following calculation equations to correct the reaction values ra, rb, and rc of the substances a to c to calculate corrected reaction values ra', rb', and rc'.

$$ra' = ra - ya$$

$$rb' = rb - yb$$

$$rc' = -yc$$

For example, when the difference between the information on the environment (amount of water vapor) surrounding the odor source 2 and the information on the environment (amount of water vapor) surrounding the odor sensor 10 (difference amount x of water vapor) is diff_h, the correction values ya, yb, and yc are da, db, dc, respectively, and the corrected reaction value ra' of the substance a, the corrected reaction value rb' of the substance b, and the corrected reaction value rc' of the substance c are as follows.

$$ra'=ra-da$$

$$rb'=rb-db$$

$$rc'=rc-dc$$

Figure 4:
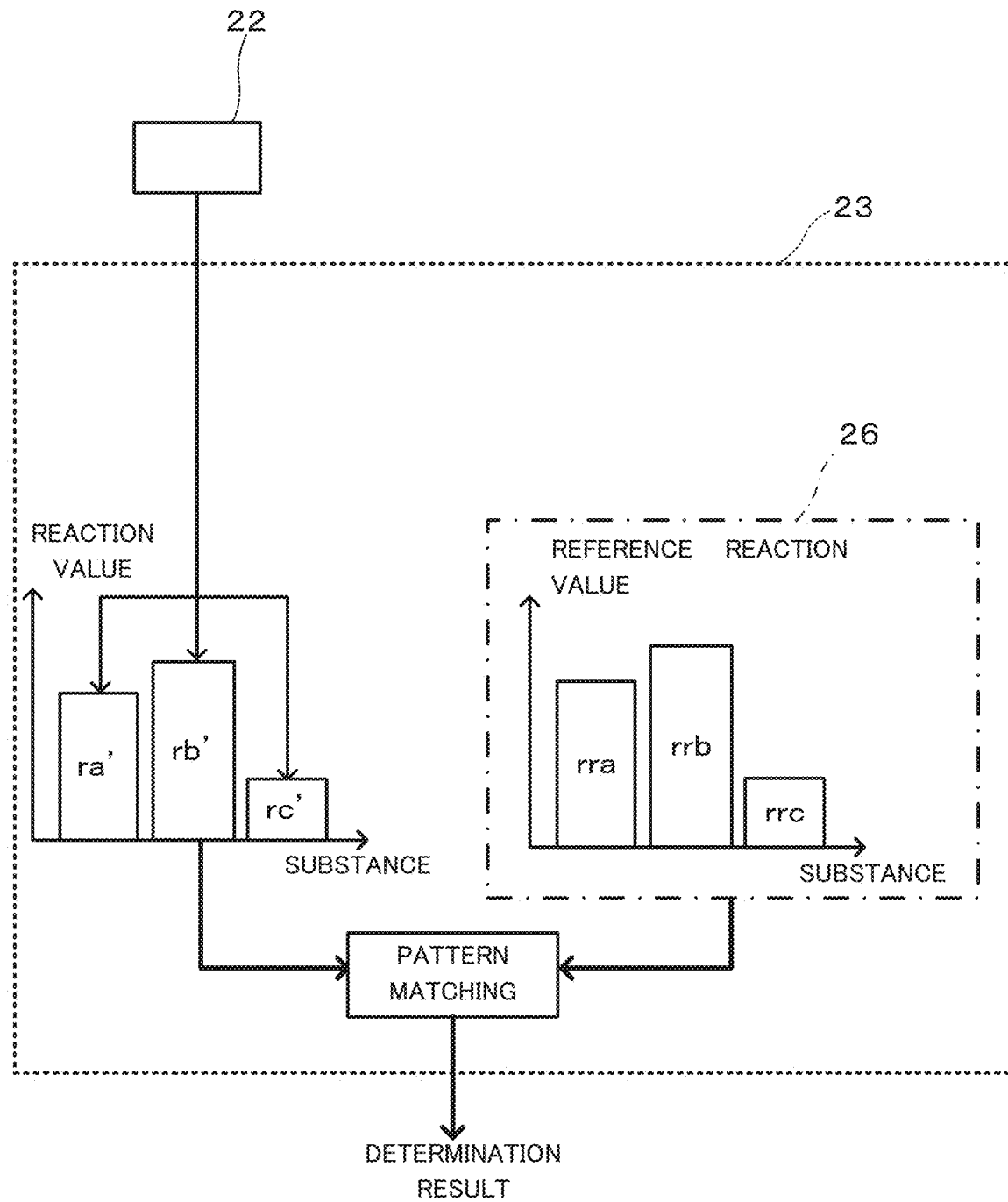
FIG. 4 is a schematic view illustrating the function of odor specification means.

The odor specification means 23 specifies the odor on the basis of the items of the information on the odor, corrected by the correction means 22, that is, the corrected reaction value ra' of the substance a, the corrected reaction value rb' of the substance b, and the corrected reaction value rc' of the substance c. As illustrated in FIG. 4, the odor specification means 23 includes a storage 26. The storage 26 stores reference reaction values rra, rrb, and rrc which are references for the sensitive membranes 5 for the substances a to c included in the odor. The reference reaction values rra, rrb, and rrc are values which are references for the reaction values of the sensitive membranes 5 in correspondence with the respective substances included in the odor. When substances included in an odor are plural, the reference reaction values rra, rrb, and rrc are numerical values precisely indicating the ratio (pattern) between the reaction values of the sensitive membranes 5 for the plurality of substances. The average value of the reaction values of the substances included in the odor from the odor source 2, measured under a situation in which the information on the environment surrounding the odor source 2 and the information on the environment surrounding the odor sensor 10 do not differ from each other, can be used as the reference reaction values rra, rrb, and rrc. The reference reaction values rra, rrb, rrc of the sensitive membranes 5 to react with the substances a to c result in, for example, such a pattern as illustrated in FIG. 4. The reaction value of the ordinate in FIG. 4 indicates the reaction values of the sensitive membranes 5 of the odor sensor 10, varying depending on the reaction of the sensitive membranes 5 with the substances in the odor sensor 10.

As illustrated in FIG. 4, the odor specification means 23 performs pattern matching of determining whether or not the pattern of the reaction values ra', rb', and rc' of the substances, corrected by the correction means 22, is similar to the pattern of the reference reaction values rra, rrb, and rrc of the substances to thereby specify the odor emitted from the odor source 2. The odor can be specified based on the degree of similarity between the pattern of the reaction values ra', rb', and rc', and the pattern of the reference reaction values rra, rrb, and rrc of the substances included in the odor. For example, the degree of the similarity between the patterns can be determined based on whether or not a distance between the position coordinate of the reaction values ra', rb', and rc', and the position coordinate of the reference reaction values rra, rrb, and rrc in space in which the normalized reaction values of the substances a to c are on the coordinate axes is equal to or less than a threshold value.

[Hardware Configuration]

Figure 5:
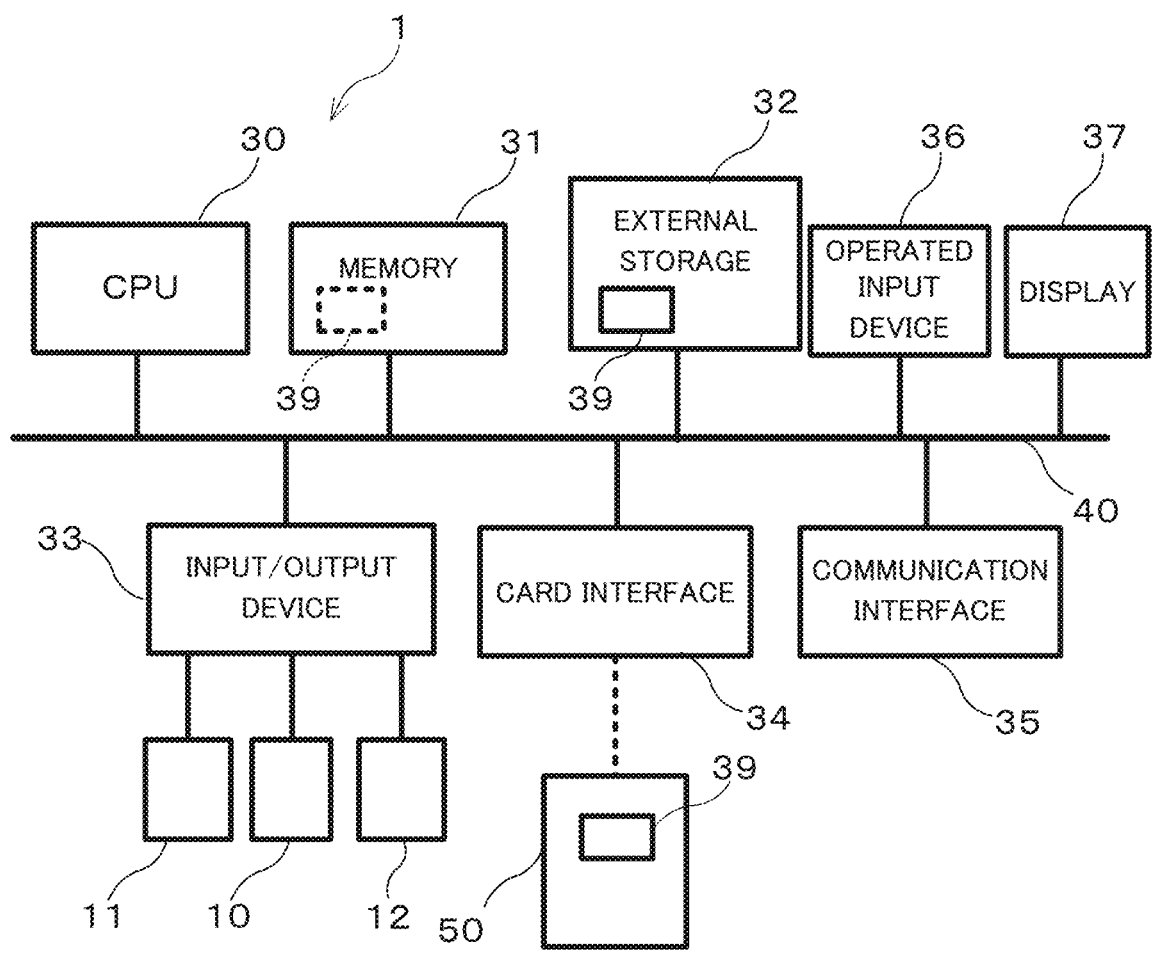
FIG. 5 is a block diagram illustrating the hardware configuration of the odor detection device in FIG. 1.

FIG. 5 illustrates the hardware configuration of the odor detection device 1. As illustrated in FIG. 5, a portion according to the information-processing device 4 of the odor detection device 1 includes a central processing unit (CPU) 30, a memory 31, an external storage 32, an input/output device 33, a card interface 34, and a communication interface 35. Each component of the odor detection device 1 is connected through an internal bus 40.

The CPU 30 is a processor (arithmetic device) to execute the software program (hereinafter simply referred to as "program"). The program 39 is read from the external storage 32 into the memory 31, and the CPU 30 performs the operations of the odor information collection means 20, the difference information acquisition means 21, the correction means 22, and the odor specification means 23 by executing the program 39 stored in the memory 31.

The memory 31 is, for example, a random access memory (RAM). The memory 31 stores data necessary for executing the program 39 by the CPU 30, and data generated as a result of executing the program 39, as well as the program 39 to be executed by the CPU 30.

The external storage 32 is, for example, a hard disk or the like. The external storage 32 stores the program 39 to be executed by the CPU 30. Moreover, the program 39 is stored in a non-transitory recording medium 50 such as a portable universal serial bus (USB) memory. The program 39 transferred from the recording medium 50 is stored in the external storage 32.

The input/output device 33 is an interface to input and output data into and from the odor sensor 10 and the environmental information measurement means 11 and 12. Information on an odor, detected by the odor sensor 10, and information on an environment, measured by the environmental information measurement means 11 and 12 are stored in the memory 31 and the like through the input/output device 33.

The card interface 34 is an interface to the recording medium 50. The program 39 is input through the card interface 34, and stored in the external storage 32. The storages 25 and 26 in the information-processing device 4 correspond to the external storage 32.

The communication interface 35 is an interface through which a connection to a communication network such as the Internet is established. A connection to an external server computer and/or the like is established through the communication interface 35. The relationship between the correction values and the difference information of the information on the environment, stored in the storage 25, and the reference reaction values rra, rrb, and rrc of the substances a to c, stored in the storage 26 can be downloaded from the server computer to the external storage 32.

An operated input device 36 is a man-machine interface to be operated by an operator. The operated input device 36 includes, for example, a keyboard, a pointing device such as a mouse, and a keyboard. An operated input into the operated input device 36 is transmitted to the CPU 30. The CPU 30 executes the program 39 in accordance with the content of the operated input.

A display 37 is a man-machine interface to display an image. The display 37 includes a cathode ray tube (CRT) or a liquid crystal display (LCD). The display 37 displays the result of determining a detected odor, and/or the like. The operated input device 36 and the display 37 may be unified into a single touch panel.

As the portion according to the information-processing device 4 in the hardware configuration illustrated in FIG. 5, a personal computer may be used, or a portable terminal such as a smartphone may be used.

The operation of the odor detection device 1 according to the present embodiment is now described. An odor detection method according to the present embodiment is an odor detection method executed by the information-processing device 4 of the odor detection device 1.

Figure 6:
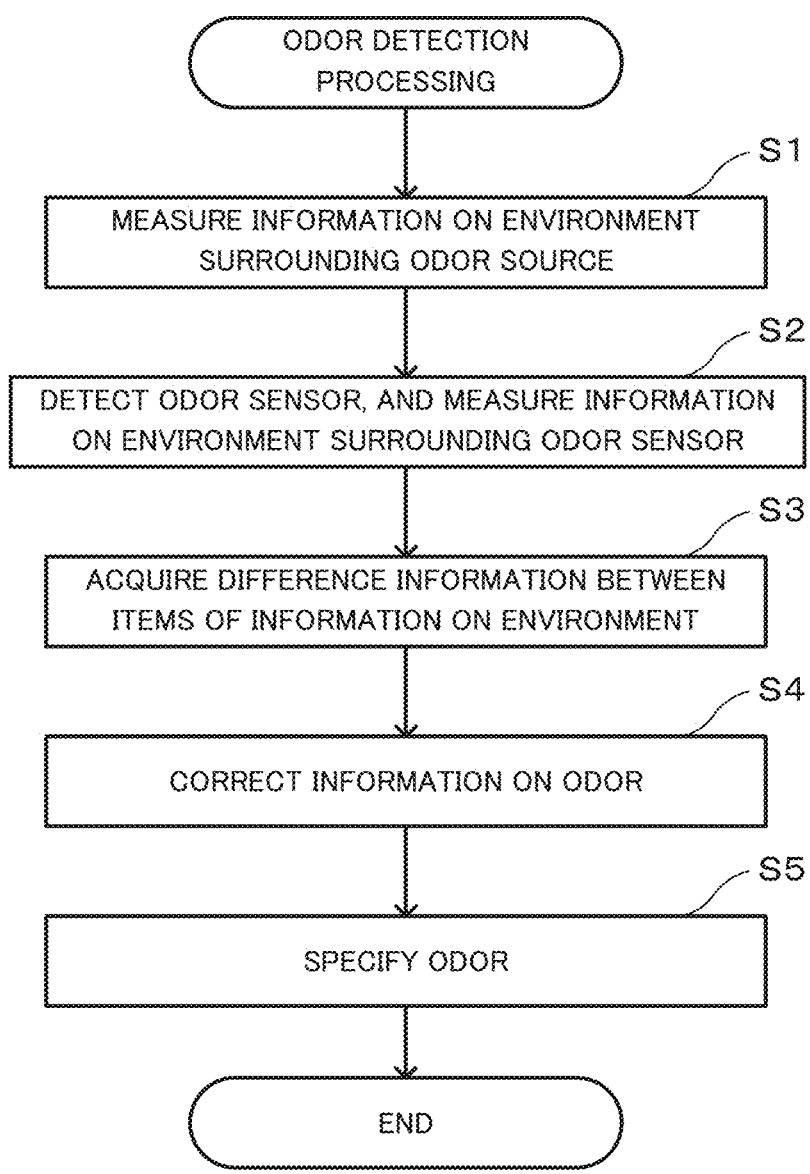
FIG. 6 is a flow chart illustrating the operation of the odor detection device.

First, as illustrated in FIG. 6, the odor detection device 1 measures information on an environment surrounding the odor source 2 (step S1; first measurement step). Specifically, the difference information acquisition means 21 acquires the information on the environment, measured by the environmental information measurement means 12, as illustrated FIG. 1. In this case, the CPU 30 inputs the information on the environment, measured by the environmental information measurement means 12, through the input/output device 33, and allows the information to be stored in the memory 31, as illustrated in FIG. 5.

Then, the odor detection device 1 detects information on an odor, detected by the odor sensor 10, and measures the information on the environment surrounding the odor sensor 10 (step S2; second measurement step). Specifically, as illustrated in FIG. 1, the odor information collection means 20 collects the information on the odor, detected by the odor sensor 10, and the difference information acquisition means 21 acquires the information on the environment, measured by the environmental information measurement means 11. In this case, as illustrated in FIG. 5, the CPU 30 inputs the information on the odor, detected by the odor sensor 10, and the information on the environment, measured by the environmental information measurement means 11, through the input/output device 33, and allows the items of the information to be stored in the memory 31.

Then, the odor detection device 1 acquires difference information indicating a difference between the information on the environment, measured in step S1 as described above and the information on the environment, measured in step S2 as described above (step S3; difference information acquisition step). Specifically, the difference information acquisition means 21 acquires the difference information indicating the difference between the information on the environment surrounding the odor sensor 10 and the information on the environment surrounding the odor source 2, as illustrated in FIG. 1. In this case, the CPU 30 calculates the amount of water vapor contained in gas surrounding the odor source 2 and the amount of water vapor contained in gas surrounding the odor sensor 10 using Equations (1), (2), and (3) as described above, on the basis of temperature and humidity stored in the memory 31 and measured by the environmental information measurement means 11 and 12, as illustrated in FIG. 5. The CPU 30 calculates, as the difference information between the items of the information on the environment, the difference amount x of water vapor, obtained by subtracting the amount of water vapor contained in the gas surrounding the odor sensor 10 from the amount of water vapor contained in the gas surrounding the odor source 2, and allows the difference amount x of water vapor to be stored in the memory 31.

Then, the odor detection device 1 corrects the information on the odor, measured in step S1 as described above, on the basis of the difference information acquired in step S3 as described above (step S4; correction step). Specifically, the correction means 22 determines correction values ya, yb, and yc corresponding to the difference amount x of water vapor, acquired by the difference information acquisition means 21, and corrects the reaction values ra, rb, and rc of the substances a to c, collected by the odor information collection means 20, on the basis of the correction values ya, yb, and yc, to calculate the corrected reaction values ra', rb', and rc' of the substances a to c. In this case, the CPU 30 determines the correction values ya, yb, and yc corresponding to the difference amount x of water vapor with reference to relationships between the difference amount x of water vapor, stored in the external storage 32, and the correction values fa(x), fb(x), and fc(x), corrects the reaction values ra, rb, and rc of the substances a to c to the reaction values ra', rb', and rc' of the substances a to c, and allows the corrected reaction values ra', rb', and rc' to be stored in the memory 31.

Then, the odor detection device 1 specifies the odor on the basis of the corrected information on the odor (reaction values ra', rb', and rc' of substances a to c) (step S5; odor specification step). Specifically, the odor specification means 23 determines whether or not the pattern of the reaction values ra', rb', and rc' of the corrected substances a to c matches the pattern of the reference reaction values rra, rrb, and rrc of the substances a to c stored in the storage 26. In this case, the CPU 30 performs the pattern matching between the pattern of the reaction values ra', rb', and rc' of the substances a to c and the pattern of the reference reaction values rra, rrb, and rrc of the substances a to c to determine whether or not to detect the odor consisting of the substances a to c. The CPU 30 displays and outputs the determination results on the display 37.

As described above, execution of the program 39 enables the computer including the hardware resources illustrated in FIG. 5 to function as: the odor information collection means 20 for collecting the information on the odor, detected by the odor sensor 10 to detect the information on the odor, emitted from the odor source 2; the difference information acquisition means 21 for acquiring the difference information (difference amount x of water vapor) indicating the difference between the information on the environment, varying the amount of water vapor contained in the gas surrounding the odor sensor 10, and the information on the environment, varying the amount of water vapor contained in the gas surrounding the odor source 2; the correction means 22 for correcting the information on the odor (reaction values ra, rb, and rc), collected by the odor information collection means 20, on the basis of the difference information (difference amount x of water vapor) acquired by the difference information acquisition means 21; and the information on the odor (reaction values ra', rb', and rc'), corrected by the correction means 22.

Embodiment 2

Embodiment 2 of the present disclosure is now described.

Figure 7:
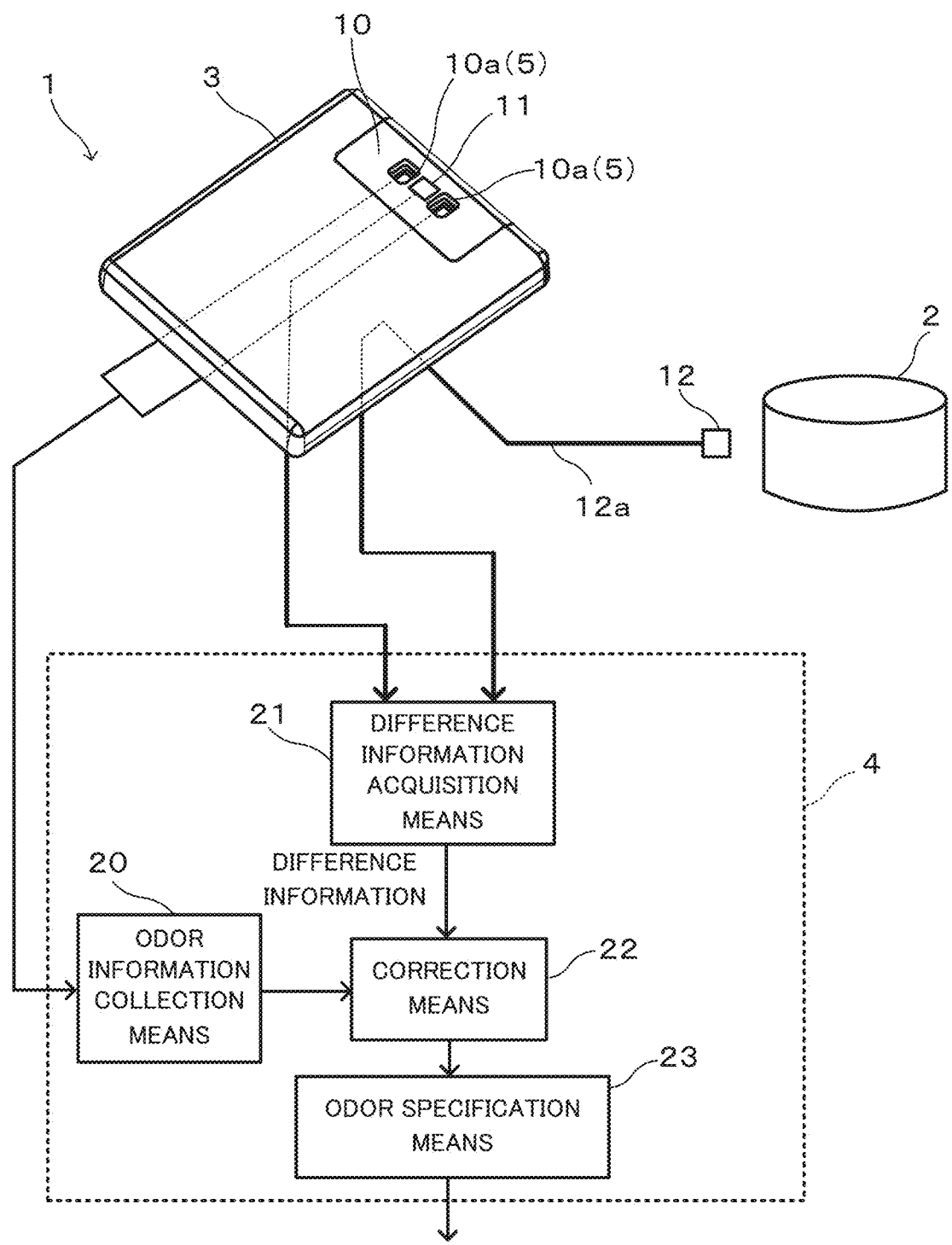
FIG. 7 is a schematic view illustrating the configuration of an odor detection device according to Embodiment 2 of the present disclosure.

As illustrated in FIG. 7, the configuration of an odor detection device 1 according to the present embodiment is the same as the configuration of the odor detection device 1 according to Embodiment 1 as described above. In other words, the odor detection device 1 according to the present embodiment includes a measurement unit 3, environmental information measurement means 12, and an information-processing device 4. An odor sensor 10 and environmental information measurement means 11 are incorporated into the measurement unit 3. In the odor sensor 10, sensitive membranes 5 are disposed in the interiors of two through-holes 10a.

The environmental information measurement means 12 is connected to the measurement unit 3 through a wired communication cable 12a. Information on an environment, measured by the environmental information measurement means 12, is transmitted to the information-processing device 4 through the wired communication cable 12a and the measurement unit 3.

The configuration of the information-processing device 4 is also the same as the configuration of the odor detection device 1 according to Embodiment 1 as described above.

Odor information collection means 20 collects items of information on an odor (reaction values ra to rc of substances a to c), detected by the odor sensor 10. Difference information acquisition means 21 acquires difference information (difference amount x of water vapor) indicating a difference between information on an environment surrounding the odor sensor 10 and information on an environment surrounding an odor source 2. Correction means 22 corrects the items of the information on the odor, collected by the odor information collection means 20, on the basis of the difference information (difference amount x of water vapor) acquired by the difference information acquisition means 21. Odor specification means 23 specifies the odor on the basis of the corrected items of the information on the odor (reaction values ra' to rc' of substances a to c).

The measurement unit 3 and the environmental information measurement means 12 may be connected in wireless communication rather than through the wired communication cable 12a. Examples of such wireless communication means include Bluetooth (registered trademark), Wi-Fi (registered trademark), and ZigBee; however, the wireless communication means is not limited thereto.

Embodiment 3

Embodiment 3 of the present disclosure is now described.

Figure 8:
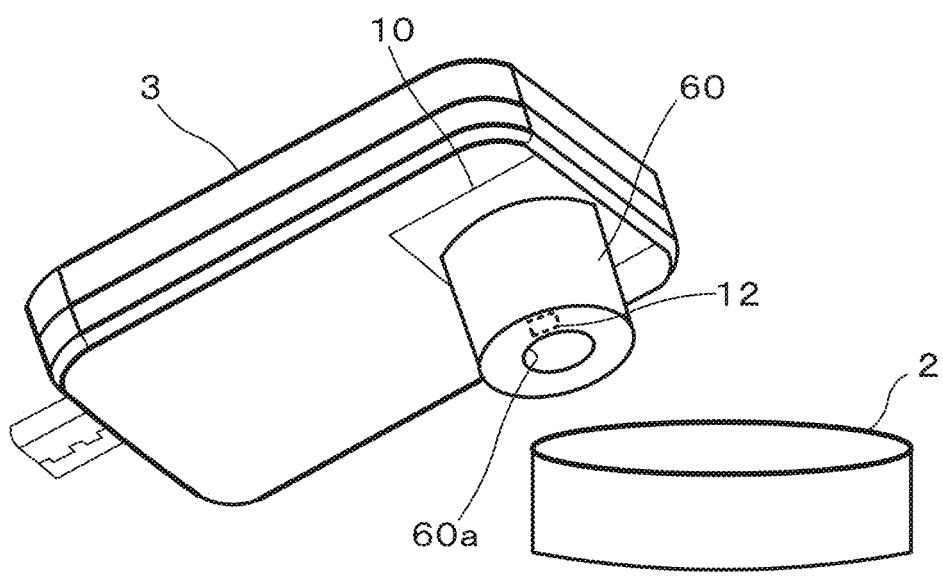
FIG. 8 is a perspective view illustrating the configuration of an odor detection device according to Embodiment 3 of the present disclosure.

An odor detection device 1 according to the present embodiment differs from the odor detection device 1 according to Embodiment 1 as described above, in that the odor detection device 1 according to the present embodiment includes a blowing opening 60 through which gas is blown into an odor sensor 10, as illustrated in FIG. 8.

The blowing opening 60 is formed of a cylindrically-shaped member in which a through-hole 60a is opened. The through-hole 60a communicates with the sensitive membranes 5 of the odor sensor 10 of a measurement unit 3. The odor sensor 10 detects items of information on an odor contained in gas blown through the blowing opening 60.

The leading end of the blowing opening 60 is provided with environmental information measurement means 12 for measuring information on an environment surrounding an odor source 2. Like Embodiment 2 as described above, the measurement unit 3 is provided with environmental information measurement means 11 (not illustrated in FIG. 8) for measuring information on an environment surrounding the odor sensor 10. Accordingly, the environmental information measurement means 12 can measure the information on the environment surrounding the odor source 2, and the environmental information measurement means 11 can measure the information on the environment surrounding the odor sensor 10.

The configuration of an information-processing device 4 is the same as the configuration of the odor detection device 1 according to Embodiment 1 as described above. In other words, difference information (difference amount x of water vapor) between the information on the environment, measured by the environmental information measurement means 12, and the information on the environment, measured by the environmental information measurement means 11, is calculated, the items of the information on the odor (reaction values ra to rc), detected by the odor sensor 10, are corrected based on the difference information, and the odor is specified based on the corrected items of the information on the odor (reaction values ra' to rc').

The odor detection device 1 according to the present embodiment can be used in various applications. For example, the odor detection device 1 according to the present embodiment can be used for, checking a mouth odor. When a breath is blown through the blowing opening 60, a substance contained in the breath can be detected. Like the present embodiment, correction enables accurate detection of the odor because the temperatures of the breath at the instant following the blowing of the breath and at the time of the arrival of the breath at the odor sensor 10 greatly differ. Like the present embodiment, correction enables accurate detection of the odor because exhaled air contains much moisture.

The position of the environmental information measurement means 12 is not limited to the position illustrated in FIG. 8. The environmental information measurement means 12 is disposed at a position at which the information on the environment surrounding the odor source 2 can be measured. For example, the environmental information measurement means 12 may be configured to be able to be drawn from the blowing opening 60.

Embodiment 4

Embodiment 4 of the present disclosure is now described.

Figure 9:
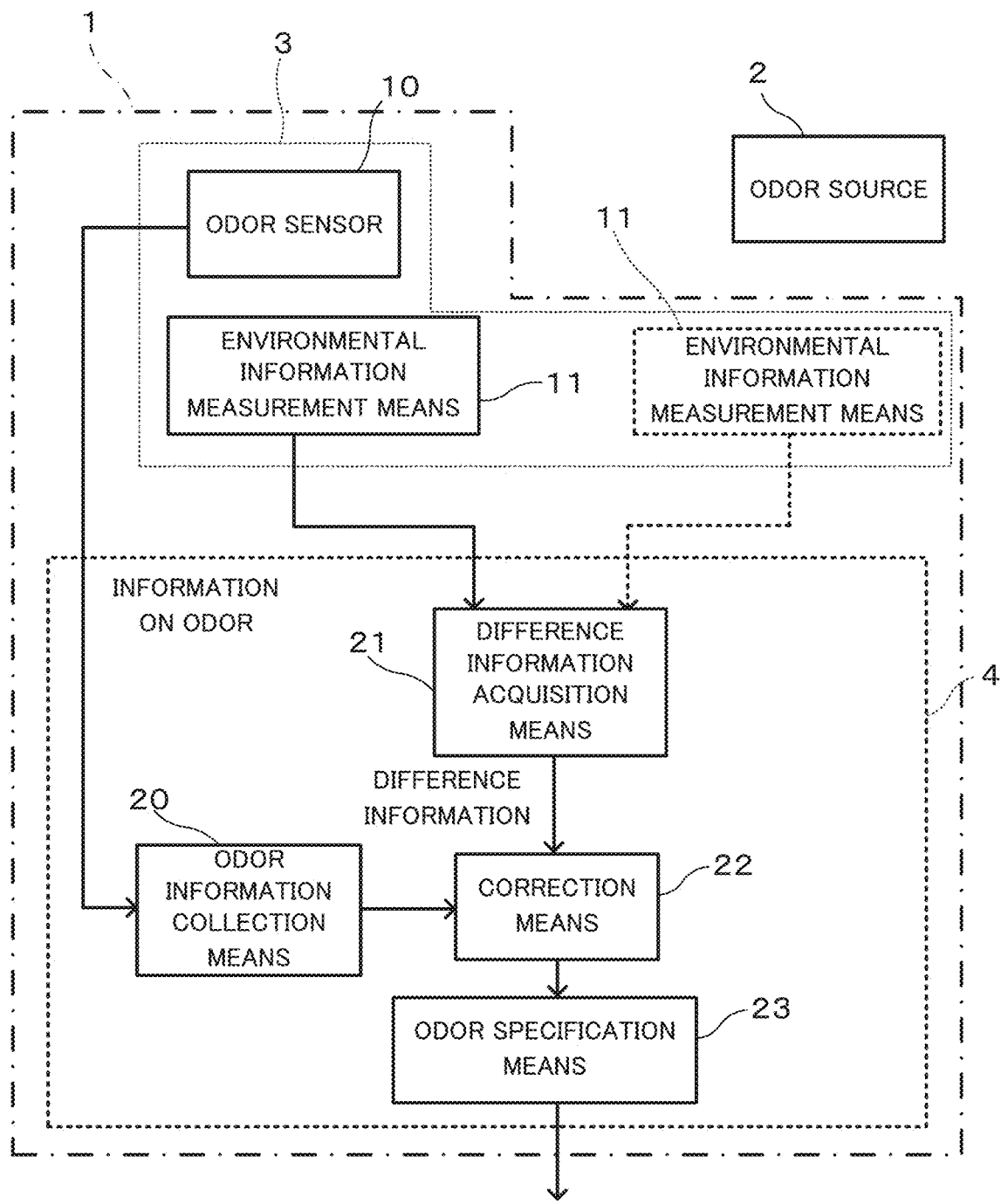
FIG. 9 is a block diagram illustrating the configuration of an odor detection device according to Embodiment 4 of the present disclosure.

As illustrated in FIG. 9, an odor detection device 1 according to the present embodiment differs from the odor detection device 1 according to Embodiment 1 as illustrated in FIG. 1, in that the odor detection device 1 according to the present embodiment is not provided with the environmental information measurement means 12.

Figure 10:
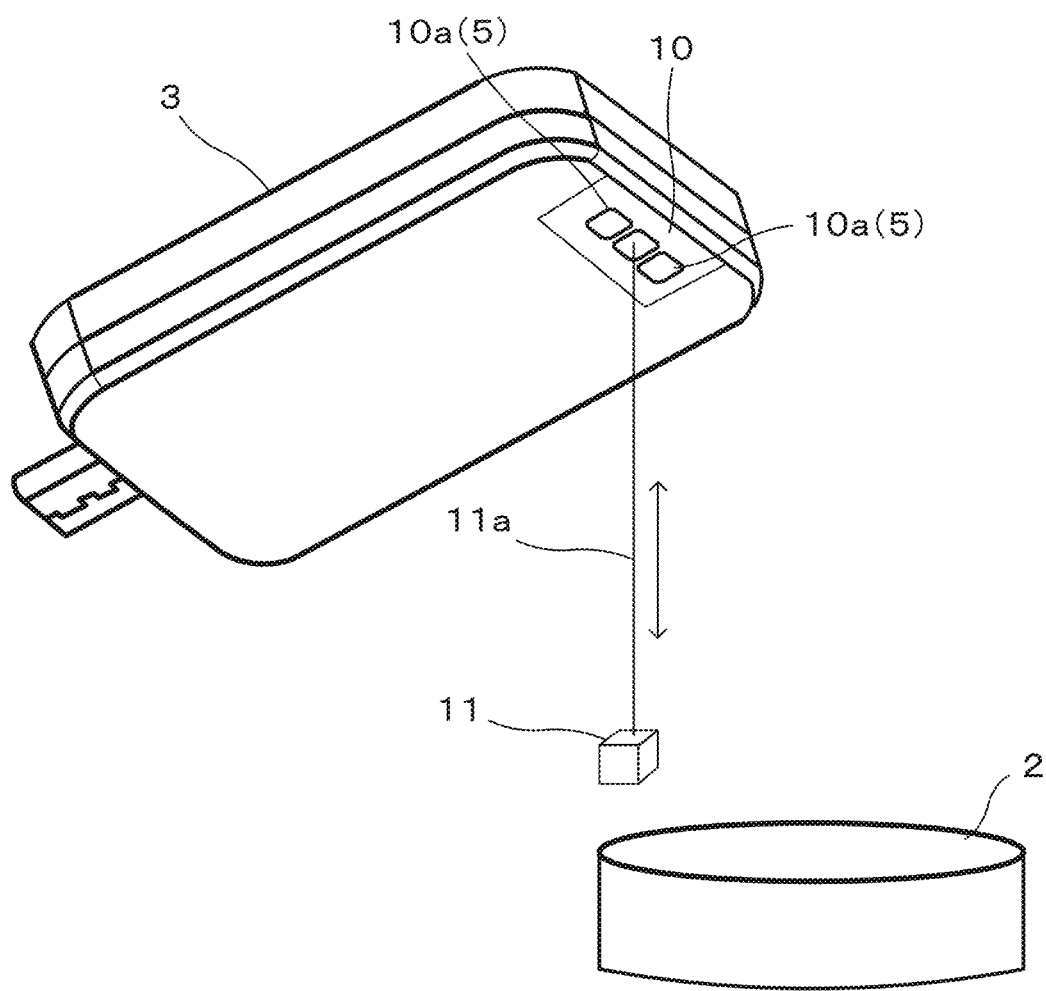
FIG. 10 is a perspective view of a measurement unit included in the odor detection device in FIG. 9.

In the odor detection device 1 according to the present embodiment, environmental information measurement means 11 measures both of information on an environment surrounding an odor source 2 and information on an environment surrounding an odor sensor 10. As illustrated in FIG. 10, the environmental information measurement means 11 is separate from a measurement unit 3, and is connected to a stretchable wired communication cable 11a so that the environmental information measurement means 11 is detachable from the measurement unit 3. In order to measure the information on the environment surrounding the odor source 2, the wired communication cable 11a is stretched to put the environmental information measurement means 11 in the vicinity of the odor source 2 to measure the information on the environment surrounding the odor source 2. In order to measure the information on the environment surrounding the odor sensor 10, the wired communication cable 11a is housed in the odor sensor 10 to place the measurement means in the vicinity of the odor sensor 10, and the information on the environment is measured.

The configuration of an information-processing device 4 according to the present embodiment is the same as the configuration of the information-processing device 4 of the odor detection device 1 according to Embodiment 1 as described above. In other words, difference information between the information on the environment, measured by the environmental information measurement means 11 stretched to the odor source 2, and the information on the environment, measured by the environmental information measurement means 11 housed in the measurement unit 3, is calculated, information on an odor, detected by the odor sensor 10 is corrected based on the difference information, and the odor is specified based on the corrected information on the odor.

Like Embodiment 2 as described above, the environmental information measurement means 11 and the measurement unit 3 including the odor sensor 10 may be connected in wired communication. The environmental information measurement means 11 and the measurement unit 3 including the odor sensor 10 may also be connected in wireless communication.

Embodiment 5

Embodiment 5 of the present disclosure is now described.

In the embodiments described above, the detection error of the information on the odor, caused by the difference between the environment surrounding the odor sensor 10 and the environment around the odor source 2, is corrected. However, examples of the odor source 2 include an odor source that per se results in variations in temperature and humidity as items of information on an environment, causing a detection error in information on an odor, to be originally detected. In the present embodiment, a system to correct a detection error in information on an odor, resulting from an odor source 2, is provided.

Figure 11:
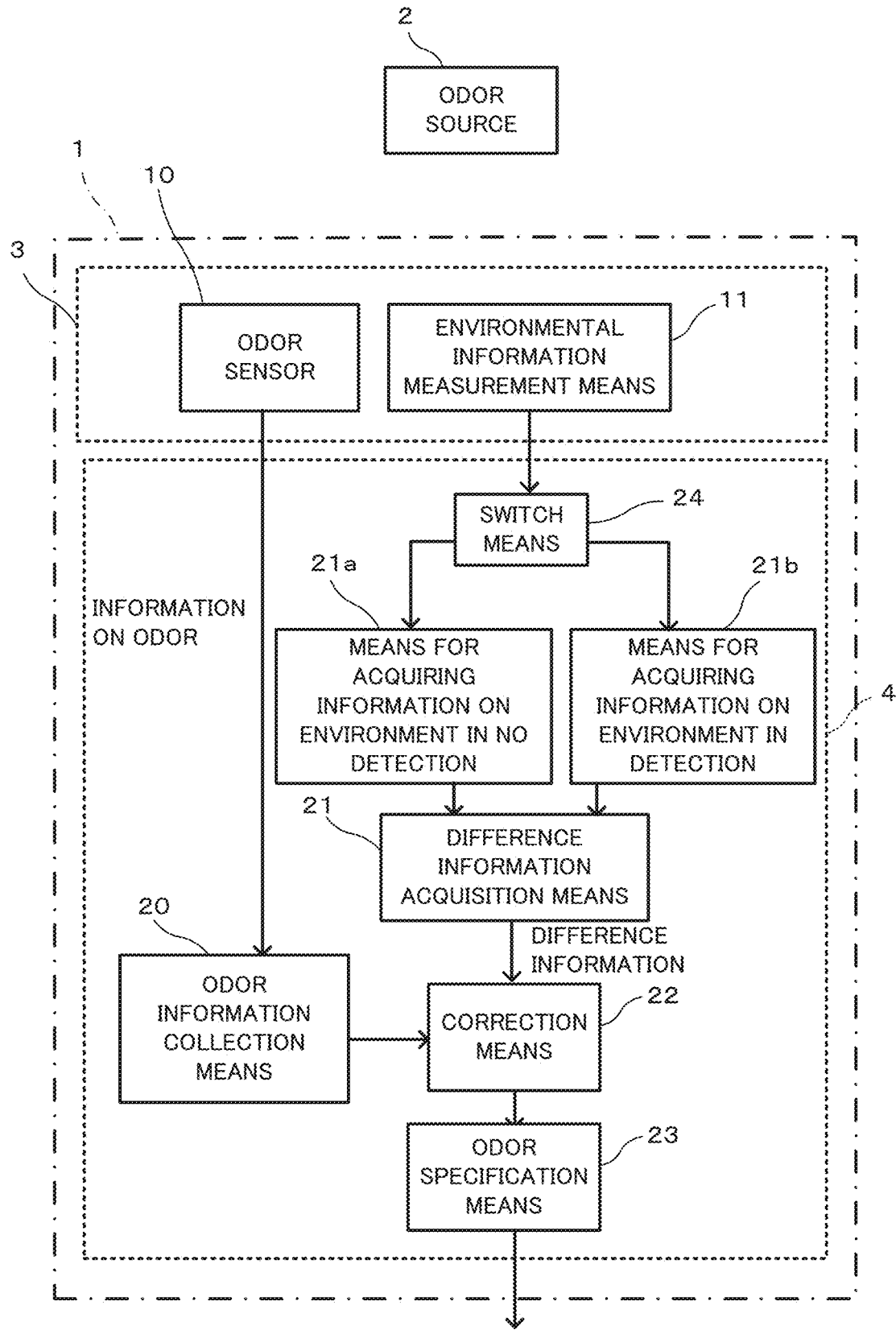
FIG. 11 is a block diagram illustrating the configuration of an odor detection device according to Embodiment 5 of the present disclosure.

As illustrated in FIG. 11, an odor sensor 10 and environmental information measurement means 11 are integrated in a measurement unit 3 in the present embodiment. An odor detection device 1 according to the present embodiment is not provided with environmental information measurement means 12. An information-processing device 4 further includes means for acquiring environmental information in no detection 21a, means for acquiring environmental information in detection 21b, and switch means 24.

Figure 12A:
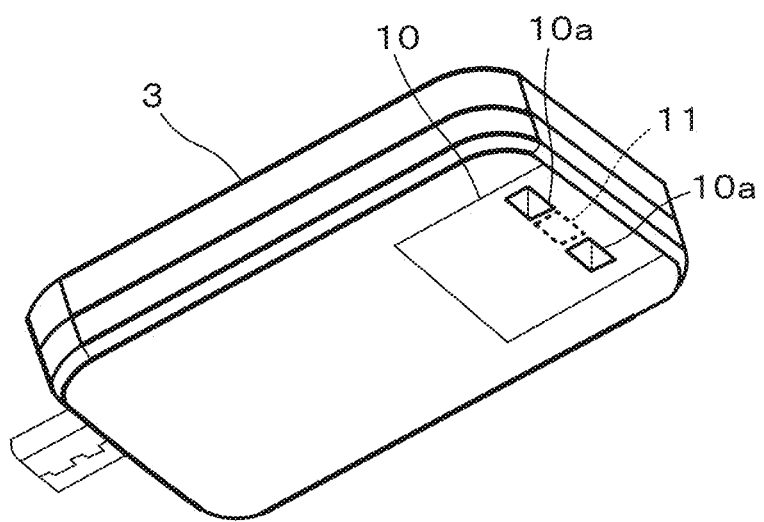
FIG. 12A is a view illustrating a state in which information on an odor is not detected.

As illustrated in FIG. 12A, in a state in which the odor source 2 does not exist around the odor sensor 10, and any odor is not detected by the odor sensor 10, the switch means 24 switches information on an environment, to be measured by the environmental information measurement means 11, so that the means for acquiring environmental information in no detection 21a acquires the information. The switch can be performed by an instruction provided by an input operated by an operator. The switch means 24 may be configured to determine whether or not an odor is detected based on the detected value of the odor sensor 10 and to perform the switching on the basis of the determination result.

Figure 12B:
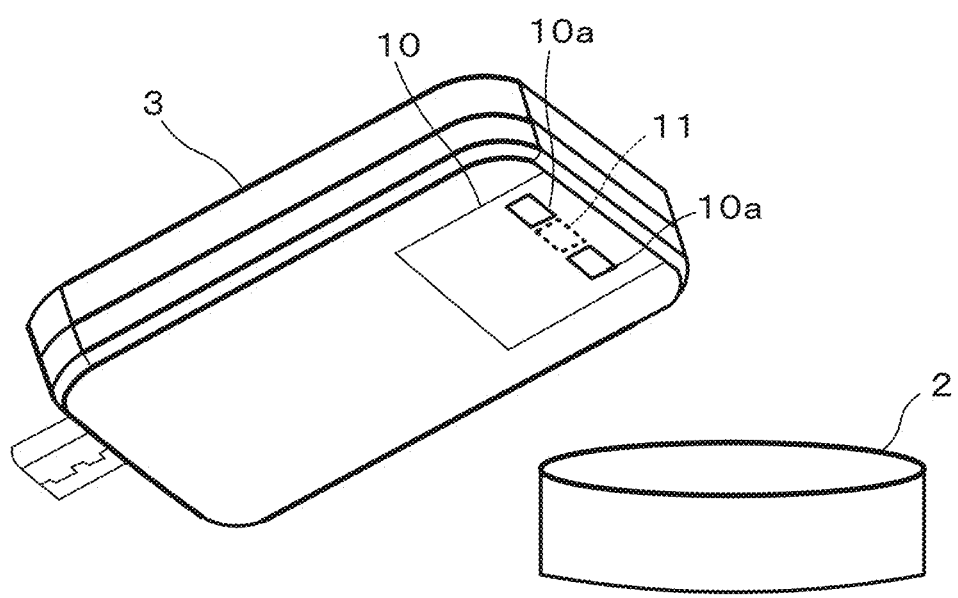
FIG. 12B is a view illustrating a state in which information on an odor is detected.

As illustrated in FIG. 12B, in a state in which the odor source 2 exists around the odor sensor 10, and an odor is detected by the odor sensor 10, the switch means 24 switches information on an environment, to be measured by the environmental information measurement means 11, so that the means for acquiring environmental information in detection 21b acquires the information.

Difference information acquisition means 21 acquires difference information indicating a difference between the information on the environment, measured by the means for acquiring environmental information in no detection 21a and the information on the environment, measured by the means for acquiring environmental information in detection 21b.

Correction means 22 calculates a correction value on the basis of the difference information acquired by the difference information acquisition means 21, and corrects information on an odor. Odor specification means 23 specifies the odor on the basis of the corrected information on the odor.

The operation of the odor detection device 1 according to the present embodiment is now described. An odor detection method according to the present embodiment is executed by the information-processing device 4 of the odor detection device 1.

Figure 13:
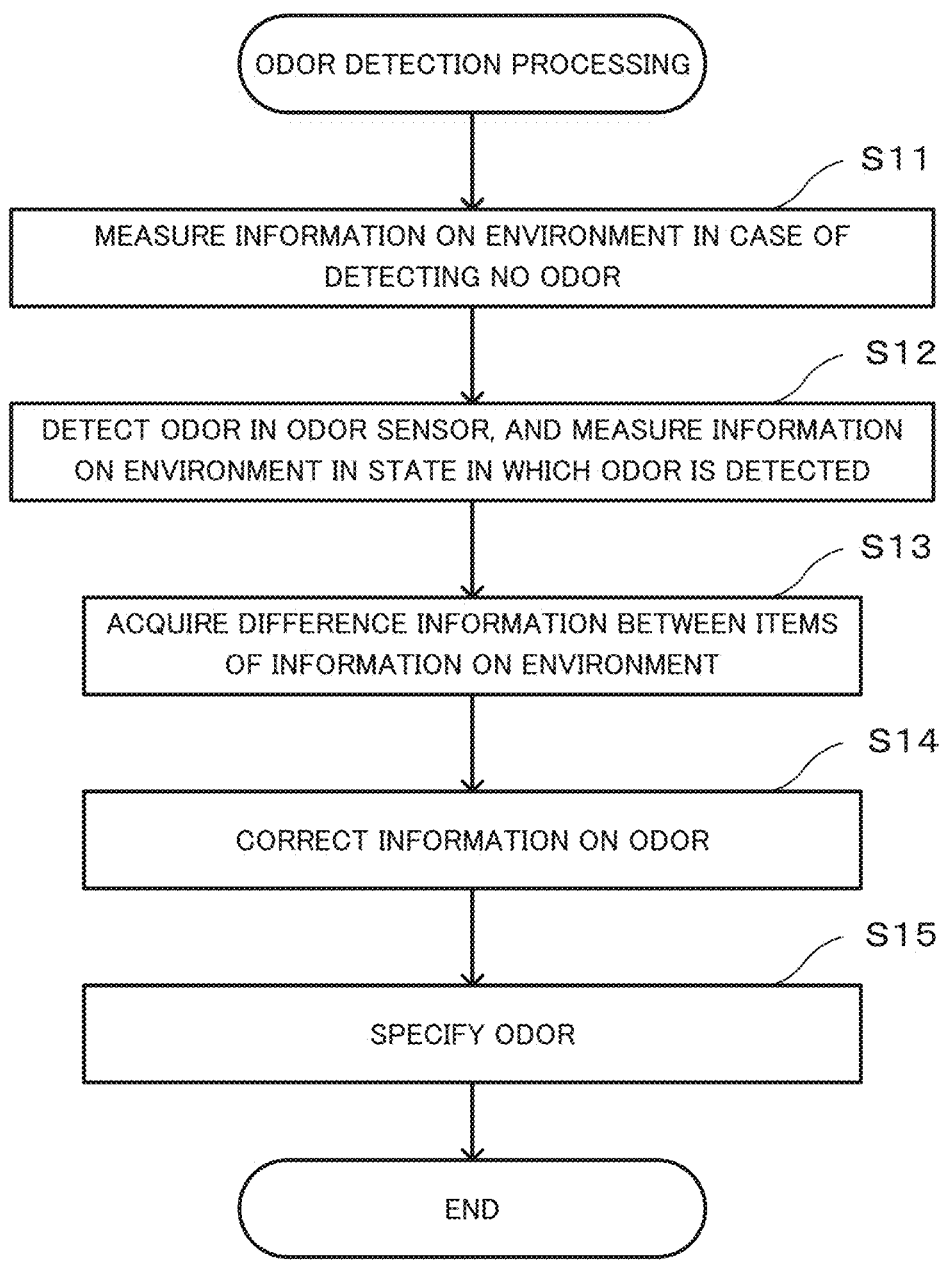
FIG. 13 is a flow chart illustrating the operation of the odor detection device in FIG. 11.

As illustrated in FIG. 13, first, the odor detection device 1 measures information on an environment in the case of detecting no odor (step S11; first measurement step). Specifically, the means for acquiring environmental information in no detection 21a acquires the information on the environment, measured by the environmental information measurement means 11, as illustrated in FIG. 11.

Then, the odor detection device 1 detects the information on the odor, detected by the odor sensor 10, and measures the information on the environment surrounding the odor sensor 10 in a state in which the information on the odor is detected by the odor sensor 10 (step S12; second measurement step). Specifically, as illustrated in FIG. 11, odor information collection means 20 collects the information on the odor, detected by the odor sensor 10, and the means for acquiring environmental information in detection 21b acquires the information on the environment, measured by the environmental information measurement means 11.

Then, the odor detection device 1 acquires difference information indicating a difference between the information on the environment, measured in step S11 as described above, and the information on the environment, measured in step S12 as described above (step S13; difference information acquisition step). Specifically, as illustrated in FIG. 11, the difference information acquisition means 21 acquires the difference information indicating the difference between the information on the environment surrounding the odor sensor 10, measured in a state in which the odor source 2 does not exist in the vicinity of the odor sensor 10, and any information on the odor is not detected, and the information on the environment in a state in which the odor source 2 exists in the vicinity of the odor sensor 10, and the information on the odor is detected by the odor sensor 10.

Figure 14A:
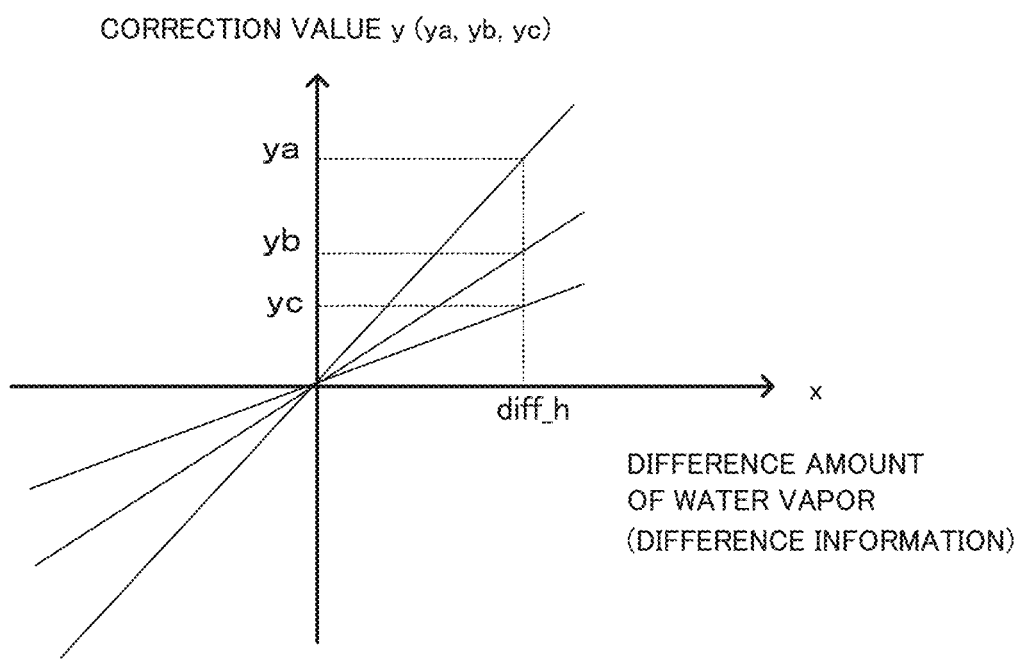
FIG. 14A is a graph indicating relationships between correction values and a difference between the amounts of water vapor.
Figure 14B:
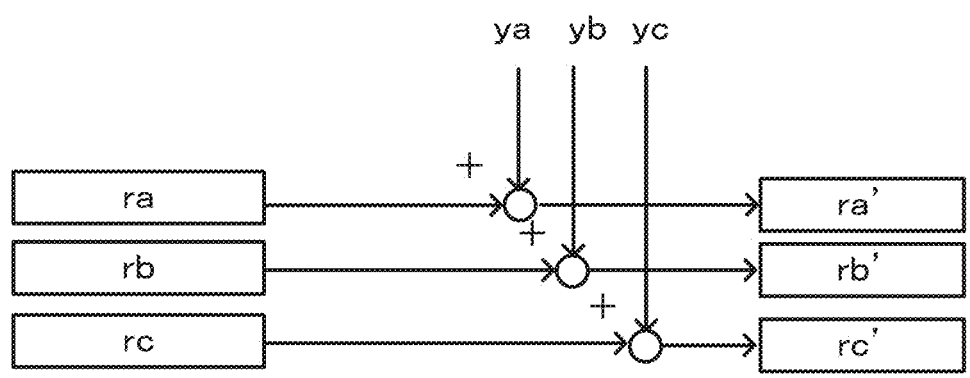
FIG. 14B is a schematic view illustrating the situation of correction based on the correction values.

Then, the odor detection device 1 corrects the information on the odor, measured in step S12 as described above, on the basis of the difference information acquired in step S13 as described above (step S14; correction step). Specifically, the correction means 22 determines correction values ya, yb, and yc corresponding to the difference amount diff_h of water vapor, acquired by the difference information acquisition means 21, on the basis of the characteristics of the correction value and the difference amount x of water vapor as the difference information, as illustrated in FIG. 14A. The correction means 22 corrects the reaction values ra, rb, and rc of the substances a to c, collected by the odor information collection means 20, on the basis of the correction values ya, yb, and yc, and calculates the corrected reaction values ra', rb', and rc' of the substances a to c, as illustrated in FIG. 14B.

Then, the odor specification means 23 of the odor detection device 1 specifies the odor on the basis of the corrected information on the odor (reaction values ra', rb', and rc' of substances a to c) (step S15; odor specification step).

In the present embodiment, the information on the environment is detected in a state in which the information on the odor is not detected by the odor sensor 10, and then, the information on the environment is detected in a state in which the information on the odor is detected by the odor sensor 10. Without limitation thereto, however, the information on the environment may be detected in a state in which the information on the odor is detected by the odor sensor 10, and then, the information on the environment may be detected in a state in which the information on the odor is not detected by the odor sensor 10.

As described above, the detected value of an odor detected by the odor sensor 10 may deviate in the odor source 2 due to the amount of saturated water vapor surrounding the odor source 2. In the present embodiment, variations in the accuracy of the measurement results, caused by the influence of the odor source 2, can be suppressed by determining the correction value of the information on the odor on the basis of the difference information indicating the difference between the information on the environment in a state in which any odor is not detected and the information on the environment in a case in which the odor is detected, and correcting the information on the odor on the basis of the correction value.

As described in detail above, in accordance with the embodiments described above, the information on the environment, correlated with the amount of water vapor contained in the gas surrounding the odor sensor 10, and the information on the environment, correlated with the amount of water vapor contained in the gas surrounding the odor source 2, are measured, and the items of the information on the odor (reaction values ra to rc) of the odor sensor 10, varying according to the amount of water vapor contained in the surrounding gas, are corrected based on the difference information (difference amount x of water vapor) between the items of the measured information on the environment. As a result, the errors of the items of the information on the odor, caused by the difference between the amount of water vapor contained in the gas surrounding the odor sensor 10 and the amount of water vapor contained in the gas surrounding the odor source 2 can be reduced, and therefore, variations in the accuracy of the measurement results can be suppressed.

In accordance with the embodiments described above, the information on the environment, correlated with the amount of water vapor contained in the gas in a case in which the information on the odor is not detected by the odor sensor 10, and the information on the environment, correlated with the amount of water vapor contained in the gas in a case in which the information on the odor is detected by the odor sensor 10, are measured, and the items of the information on the odor (reaction values ra to rc) of the odor sensor 10, varying according to the amount of water vapor contained in the surrounding gas, are corrected based on the difference information (difference amount x of water vapor) between the items of the measured information on the environment. As a result, the errors of the items of the information on the odor, caused by the difference between the amount of water vapor contained in the gas that is not in the vicinity of the odor source 2 and the amount of water vapor contained in the gas that is in the vicinity of the odor source 2, can be reduced, and therefore, variations in the accuracy of the measurement results can be suppressed.

In the embodiments described above, highly accurate correction is enabled because the correction is performed in a range in which a relationship between the difference amount of water vapor and the correction values of the reaction values ra to rc of the substances a to c can be regarded as a linear relationship. In other words, an advantage in that the correction can be performed with high accuracy in a range in which the linear relationship is maintained, on the basis of the difference between the items of the information on the environment, rather than the information on the environment itself, is one of the advantages of the odor detection device 1.

In accordance with the embodiments described above, the odor sensor 10 includes the plurality of sensitive membranes 5 (5a, 5b, and 5c) to react with the substances a to c different from each other, and outputs items of information indicating the reaction results of the substances a to c as the items of the information on the odor in correspondence with the respective sensitive membranes 5. In contrast, the correction means 22 corrects the items of the information on the odor (reaction values ra to rc) in correspondence with the respective sensitive membranes 5. In such a manner, the odor including the plural kinds of the substances a to c can be accurately detected.

In accordance with the embodiments described above, the storage 25 to store the relationships between the difference information indicating the difference between the information on the environment of the air surrounding the odor sensor 10 and the information on the environment of the air surrounding the odor source 2, and the correction values corresponding to the respective sensitive membranes 5 is included, and the correction means 22 determines the correction value corresponding to the difference information on the basis of the relationships stored in the storage 25, and corrects the items of the information on the odor on the basis of the determined correction value. In such a manner, the reaction values can be accurately corrected in correspondence with the respective sensitive membranes 5.

The odor detection device 1 according to each of Embodiments 1 to 3 as described above includes: the environmental information measurement means 11 for measuring the information on the environment surrounding the odor sensor 10; and the environmental information measurement means 12 for measuring the information on the environment surrounding the odor source 2. The correction means 22 corrects the items of the information on the odor (reaction values ra to rc) on the basis of the difference information between the information on the environment, measured by the environmental information measurement means 12, and the information on the environment, measured by the environmental information measurement means 11. In such a manner, the information on the environment surrounding the odor sensor 10 and the information on the environment surrounding the odor source 2 can be simultaneously measured.

In accordance with the embodiments described above, the blowing opening 60 for blowing gas into the odor sensor 10 is disposed. The blowing opening 60 is provided with the environmental information measurement means 12. In such a manner, air that has been emitted from the odor source 2 and is to be detected by the odor sensor 10 can be reliably trapped to enable measurement of the information on the environment.

In the embodiments described above, the odor sensor 10 and the environmental information measurement means 11 may be configured to be integrated. In such a manner, the information on the environment surrounding the odor sensor 10 can be accurately detected.

In the embodiments described above, the environmental information measurement means 12 and the measurement unit 3 including the odor sensor 10 may be connected in wired communication, or the environmental information measurement means 12 and the measurement unit 3 including the odor sensor 10 may be connected in wireless communication. The connection between the measurement unit 3 and the environmental information measurement means 12 in wireless communication enables a positional relationship between the measurement unit 3 and the environmental information measurement means 12 to be freely changed within a distance enabling the wireless communication.

The odor detection device 1 according to Embodiment 4 as described above is configured to include the environmental information measurement means 11 separate from the measurement unit 3, and the environmental information measurement means 11 is configured to be removably connected to the measurement unit 3. However, the present disclosure is not limited thereto. The environmental information measurement means 11 integrated with the odor sensor 10 may be configured to measure the information on the environment surrounding the odor source 2 and the information on the environment surrounding the odor sensor 10. In such a manner, it is not necessary to dispose a plurality of measurement means for measuring information on an environment. The environmental information measurement means 11 and the measurement unit 3 including the odor sensor 10 may be configured to be connected in wireless communication. The connection between the measurement unit 3 and the environmental information measurement means 11 in wireless communication enables a positional relationship between the measurement unit 3 and the environmental information measurement means 11 to be freely changed within a distance enabling the wireless communication.

In accordance with the embodiments described above, the information on the environment includes temperature and humidity. However, the present disclosure is not limited thereto. Only temperature or humidity may be measured as the information on the environment. The information on the environment to be measured is not limited to temperature and humidity as long as the information is information on an environment, affecting the amount of water vapor in surrounding air.

The sensitive membranes 5 may be provided with environmental information measurement means 11, respectively. A plurality of environmental information measurement means 12 may be included in a case in which a plurality of odor sources 2 exists.

In the embodiments described above, the correction means 22 includes the storage 25, and the odor specification means 23 includes the storage 26. However, the present disclosure is not limited thereto. The odor detection device 1 may include the storages 25 and 26.

In addition, the hardware or software configuration of the odor detection device 1 is an example, and can be optionally changed and modified.

A portion that plays a key role in processing in the odor detection device 1 including the odor information collection means 20, the difference information acquisition means 21, the correction means 22, the odor specification means 23, and the like may be implemented using a usual computer system without using a dedicated system. For example, the odor detection device 1 to execute the above-described processing may be configured by distributing a computer program for executing the above-described operation, stored in a computer-readable recording medium (flexible disc, CD-ROM, DVD-ROM, or the like), and by installing the computer program on a computer. A usual computer system may, for example, download the computer program, stored in a storage included in a server device on a communication network such as the Internet, to configure the odor detection device 1.

Only an application program portion may be stored in a recording medium and a storage, for example, in the case of implementing the function of the odor detection device 1 by sharing between an operating system (OS) and the application program, or in cooperation between the OS and the application program.

A computer program can be superimposed on carrier waves, and distributed through a communication network. For example, the computer program may be posted on a bulletin board system (BBS) on the communication network to distribute the computer program through the network. It is also acceptable to make such a configuration may be made that the processing can be executed by starting the computer program and executing the computer program in a manner similar to that of another application program under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims priority based on Japanese Patent Application No. 2020-94854, filed on May 29, 2020, and Japanese Patent Application No. 2020-217205, filed on Dec. 25, 2020, the entire disclosures of which are incorporated by reference herein.

INDUSTRIAL APPLICABILITY

The present disclosure can be applied to detection of an odor.

REFERENCE SIGNS LIST

1 Odor detection device
2 Odor source
3 Measurement unit
4 Information-processing device
5 Sensitive membrane
10 Odor sensor
10a Through-hole
11, 12 Environmental information measurement means
11a, 12a Wired communication cable
20 Odor information collection means
21 Difference information acquisition means
21a means for acquiring environmental information in no detection
21b means for acquiring environmental information in detection
22 Correction means
23 Odor specification means
24 Switch means
25, 26 Storage
30 CPU
31 Memory
32 External storage
33 Input/output device
34 Card interface
35 Communication interface
36 Operated input device
37 Display
39 Program
40 Internal bus
50 Recording medium
60 Blowing opening
60a Through-hole

The invention claimed is:
1. An odor detection device, comprising:
an odor sensor to detect information on an odor emitted from a source;
environmental information measurement means for measuring information on an environment, correlated with an amount of water vapor contained in surrounding gas;

odor information collection means for collecting the information on the odor, detected by the odor sensor;
difference information acquisition means for acquiring difference information indicating a difference between the information on the environment surrounding the odor sensor measured in a state in which the information on the odor has not been detected by the odor sensor, the information on the environment surrounding the odor sensor measured in a state in which the information on the odor has been detected by the odor sensor, and the information on the environment surrounding the source; and
correction means for correcting the information on the odor, collected by the odor information collection means, based on the difference information acquired by the difference information acquisition means.

2. The odor detection device according to claim 1, wherein the odor sensor and the environmental information measurement means are integrated.

3. The odor detection device according to claim 1, wherein the environmental information measurement means comprises:
first measurement means for measuring the information on the environment surrounding the odor sensor; and
second measurement means for measuring the information on the environment surrounding the source; and
the correction means corrects the information on the odor, based on information on a difference between the information on the environment, measured by the second measurement means, and the information on the environment, measured by the first measurement means.

4. The odor detection device according to claim 3, further comprising:
a blowing opening through which gas is blown into the odor sensor, wherein
the blowing opening is provided with the second measurement means.

5. The odor detection device according to claim 3, wherein a measurement unit into which the odor sensor and the first measurement means are integrated and the second measurement means are connected in wired communication.

6. The odor detection device according to claim 3, wherein a measurement unit into which the odor sensor and the first measurement means are integrated and the second measurement means are connected in wireless communication.

7. The odor detection device according to claim 1, wherein the odor sensor comprises a plurality of sensitive membranes to react with substances different from each other, and
outputs items of information indicating sensitivity results of the substances, as items of the information on the odor, in correspondence with the sensitive membranes, respectively, and
the correction means corrects the items of the information on the odor in correspondence with the sensitive membranes, respectively.

8. The odor detection device according to claim 7, further comprising a storage to store a relationship between the difference information and a correction value corresponding to each of the sensitive membranes,
wherein the correction means determines the correction value corresponding to the difference information, based on the relationship stored in the storage, and corrects the odor information, based on the determined correction value.

9. The odor detection device according to claim 1, wherein the information on the environment comprises at least one of temperature or humidity.

10. An odor detection device, comprising:
an odor sensor to detect information on an odor emitted from a source;
environmental information measurement means for measuring information on an environment, correlated with an amount of water vapor contained in surrounding gas;
odor information collection means for collecting the information on the odor, detected by the odor sensor;
difference information acquisition means for acquiring difference information indicating a difference between the information on the environment, measured in a state in which the information on the odor has not been detected by the odor sensor, and the information on the environment, measured in a state in which the information on the odor has been detected by the odor sensor; and
correction means for correcting the information on the odor, collected by the odor information collection means, based on the difference information acquired by the difference information acquisition means.

11. The odor detection device according to claim 10, wherein the environmental information measurement means is
separate from a measurement unit comprising the odor sensor, and
removable from the measurement unit.

12. An odor detection method to be executed by an information-processing device, the odor detection method comprising:
a first measurement step of measuring information on an environment, correlated with an amount of water vapor contained in gas surrounding a source of an odor, in a state in which information on an odor is not detected by the odor sensor:
a second measurement step of detecting information on the odor by an odor sensor in a state in which the information on the odor is detected by the odor sensor and measuring information on an environment, correlated with an amount of water vapor contained in gas surrounding the odor sensor;
a difference information acquisition step of acquiring difference information indicating a difference between the information on the environment, measured in the first measurement step, and the information on the environment, measured in the second measurement step; and
a correction step of correcting the information on the odor, detected by the second measurement step, based on the difference information acquired in the difference information acquisition step.

13. An odor detection method to be executed by an information-processing device, the odor detection method comprising:
a first measurement step of measuring information on an environment, correlated with an amount of water vapor contained in gas surrounding an odor sensor, in a state in which information on an odor is not detected by the odor sensor;
a second measurement step of detecting information on an odor by the odor sensor in a state in which the information on the odor is detected by the odor sensor, and measuring the information on the environment;
a difference information acquisition step of acquiring difference information indicating a difference between the information on the environment, measured in the first measurement step, and the information on the environment, measured in the second measurement step; and a correction step of correcting the information on the odor, detected in the second measurement step, based on the difference information acquired in the difference information acquisition step.

14. A non-transitory computer-readable storage medium storing a program causing a computer to function as:

odor information collection means for collecting information on an odor, detected by an odor sensor to react with an odor generated from a source;

difference information acquisition means for acquiring difference information indicating a difference between information on an environment, measured in a state in which the information on the odor is not detected by the odor sensor, and correlated with an amount of water vapor contained in gas surrounding the odor sensor, and information on an environment, measured in a state in which the information on the odor is detected by the odor sensor, and correlated with an amount of water vapor contained in gas surrounding the source; and correction means for correcting the information on the odor, collected by the odor information collection means, based on the difference information acquired by the difference information acquisition means.

15. A non-transitory computer-readable storage medium storing a program causing a computer to function as:

odor information collection means for collecting information on an odor, detected by an odor sensor to react with an odor generated from a source;

difference information acquisition means for acquiring difference information indicating a difference between information on an environment, measured in a state in which the information on the odor is not detected by the odor sensor, and correlated with an amount of water vapor contained in gas surrounding the odor sensor, and the information on the environment, measured in a state in which the information on the odor is detected by the odor sensor; and correction means for correcting the odor information collected by the odor information collection means, based on the difference information acquired by the difference information acquisition means.

* * * * *